US011742976B2

(12) United States Patent
Nakagawa et al.

(10) Patent No.: US 11,742,976 B2
(45) Date of Patent: Aug. 29, 2023

(54) OPTICAL BRANCH INSERTION DEVICE AND OPTICAL TRANSMISSION SYSTEM USING OPTICAL BRANCH INSERTION DEVICE

(71) Applicant: Nippon Telegraph and Telephone Corporation, Tokyo (JP)

(72) Inventors: Masahiro Nakagawa, Musashino (JP); Kana Masumoto, Musashino (JP); Hidetoshi Onda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 72 days.

(21) Appl. No.: 17/438,693

(22) PCT Filed: Mar. 12, 2020

(86) PCT No.: PCT/JP2020/010929
§ 371 (c)(1),
(2) Date: Sep. 13, 2021

(87) PCT Pub. No.: WO2020/195913
PCT Pub. Date: Oct. 1, 2020

(65) Prior Publication Data
US 2022/0149968 A1 May 12, 2022

(30) Foreign Application Priority Data
Mar. 26, 2019 (JP) ................. 2019-057568

(51) Int. Cl.
*H04B 10/27* (2013.01)
*H04J 14/02* (2006.01)

(52) U.S. Cl.
CPC .......... *H04J 14/0201* (2013.01); *H04B 10/27* (2013.01)

(58) Field of Classification Search
CPC ........ H04B 10/27; H04J 14/02; H04J 14/0201
See application file for complete search history.

(56) References Cited

U.S. PATENT DOCUMENTS

| 7,181,095 B1* | 2/2007 | Meli | ..................... H04J 14/021 385/11 |
| 2005/0281558 A1* | 12/2005 | Wang | ................. H04J 14/0209 398/85 |

(Continued)

FOREIGN PATENT DOCUMENTS

| WO | WO 2014050064 | 4/2014 |
| WO | WO 2017150277 | 9/2017 |

OTHER PUBLICATIONS

Sakamaki et al., "Optical switch technology that realizes a more flexible optical node," NTT Technology Journal, 2013, 25(11):16-20, 11 pages (with English translation).

*Primary Examiner* — Dzung D Tran
(74) *Attorney, Agent, or Firm* — Fish & Richardson P.C.

(57) ABSTRACT

Device cost and electric power consumption are reduced. Nodes 11a to 11d as optical add/drop multiplexers each include cAWGs 24a and 24b that include a plurality of first side ports and a plurality of second side ports connected between light transmission paths as optical fibers 12 and 13 and transponders 25a to 25n and in which a first optical signal input-output channel interval of each port is a plurality of times larger than a second optical signal input-output channel interval of ports of the transponders 25a to 25n and optical signals of a plurality of different wavelengths from one or a plurality of transponders 25a to 25n or the light transmission paths can pass through a first channel. The cAWGs 24a and 24b cause the optical signals from the transponders 25a to 25n to pass through the first side ports, and then cyclically outputs and transmits the optical signals through the plurality of second side ports in a predetermined (Continued)

order to the light transmission paths. The optical signals transmitted through the light transmission paths are caused to pass through the second side ports and then output from the plurality of first side ports in a predetermined order to the transponders 25*a* to 25*n*.

13 Claims, 16 Drawing Sheets

(56) References Cited

U.S. PATENT DOCUMENTS

| 2014/0147121 | A1* | 5/2014 | Matsukawa | H04J 14/0206 |
| | | | | 398/83 |
| 2015/0256283 | A1* | 9/2015 | Takahashi | H04Q 11/0005 |
| | | | | 398/48 |
| 2019/0058526 | A1* | 2/2019 | Matsuyama | H04B 10/27 |

* cited by examiner

| WAVELENGTH \ LINK NUMBER | #1 | #2 | #3 | #4 |
|---|---|---|---|---|
| $\lambda 1$ | IN USE | AVAILABLE | AVAILABLE | AVAILABLE |
| $\lambda 2$ | AVAILABLE | AVAILABLE | AVAILABLE | AVAILABLE |
| $\lambda 3$ | AVAILABLE | AVAILABLE | IN USE | IN USE |
| $\lambda 4$ | AVAILABLE | AVAILABLE | AVAILABLE | AVAILABLE |
| ⋮ | | | | |

OPTICAL BRANCH INSERTION DEVICE AND OPTICAL TRANSMISSION SYSTEM USING OPTICAL BRANCH INSERTION DEVICE

CROSS-REFERENCE TO RELATED APPLICATIONS

This application is a National Stage application under 35 U.S.C. § 371 of International Application No. PCT/JP2020/010929, having an International Filing Date of Mar. 12, 2020, which claims priority to Japanese Application Serial No. 2019-057568, filed on Mar. 26, 2019. The disclosure of the prior application is considered part of the disclosure of this application, and is incorporated in its entirety into this application.

TECHNICAL FIELD

The present invention relates to an optical add/drop multiplexer used for light wavelength multiplexing or wavelength division multiplexing (WDM) in a communication network and configured to drop and add an optical signal transmitted through an optical fiber, and a light transmission system using the optical add/drop multiplexer.

BACKGROUND ART

The connection form of a communication network has evolved from a point-to-point (P2P) connection form, a ring connection form, a multi-the ring connection form, and a mesh connection form. The P2P connection form is a form in which nodes as light transmission devices each configured to terminate communication data and relay the communication data to a communication terminal are oppositely connected with each other in a one-to-one state through an optical fiber. The ring connection form is a form in which a plurality of nodes are connected with one another in a ring shape through an optical fiber. The multi-the ring connection form is a form in which a plurality of rings in ring connection are connected with each other through nodes by optical fibers, and is included in mesh connection to be described later. The mesh connection form is a form in which nodes are connected in mesh with one another through optical fibers to perform mutual communication therebetween.

Development of an optical add/drop multiplexer (OADM) as a node is behind such network connection form evolution, and progress has been made in establishment of an economical photonic transport network and flexibility of operation thereof.

Examples of the optical add/drop multiplexer include a CDC (colorless, directionless, and contentionless)-ROADM (reconfigurable optical add/drop multiplexer) having high functionality with the three functions of a first function, a second function, and a third function to be described later. The CDC-ROADM enables remote reconstruction of an optical layer. The ROADM is a function to enable add/drop of an optical signal at each node. The CDC is a function (CDC function) to connect an optical signal added/dropped in a multi-path ROADM to a transponder (optical relay) without signal collision irrespective of a wavelength and a path.

A color-less function as the first function is a function with which an optical signal from a transponder can be output to the same path at an optional wavelength without change of physical wiring.

A direction-less function as the second function is a function with which an optical signal from a transponder can be output at an optional path without change of physical wiring.

A contention-less function as the third function is a function with which output to a path different from an existing path (existing transmission path) can be performed at the same wavelength from different transponders without change of physical wiring.

Examples of a light transmission system using such an optical add/drop multiplexer include a technology disclosed in Non-Patent Literature 1.

CITATION LIST

Non-Patent Literature

Non-Patent Literature 1: Youhei Sakamaki and two others, "Optical switch technology for achieving more flexible optical node", NTT technology journal 2013. 11.

SUMMARY OF THE INVENTION

Technical Problem

However, the CDC-ROADM used as the optical add/drop multiplexer described above uses a large number of active devices such as a multicast switch configured to perform switching when data is transferred from one transmission source to a plurality of destinations and an amplifier.

Price per bit increases when the CDC-ROADM, which is expensive due to use of such components, is used in an area having a small traffic amount. In addition, electric power consumption increases when a large number of amplifiers are used in the CDC-ROADM. In this manner, the optical add/drop multiplexer such as the CDC-ROADM uses a large number of active devices and amplifiers, and thus device cost and electric power consumption increase in exchange for the flexibility of network operation, which has been a problem.

The present invention is intended to solve the above-described problem and provide an optical add/drop multiplexer having reduced device cost and electric power consumption and a light transmission system using the optical add/drop multiplexer.

Means for Solving the Problem

As a solution to the above-described problem, an invention according to claim 1 is an optical add/drop multiplexer configured to drop or add an optical signal between the optical add/drop multiplexer and a transponder connected with a communication terminal, the optical signal being transmitted by wavelength division multiplexing to a light transmission path included in a communication network, the optical add/drop multiplexer includes a cyclic arrayed waveguide grating (cAWG) that includes a plurality of first side ports and a plurality of second side ports connected between the transponder and the light transmission path and in which a first channel interval of each of the first and second side ports is a plurality of times larger than a second channel interval of an optical signal input to and output from the transponder and optical signals of a plurality of different wavelengths from one or a plurality of the transponders or the light transmission path can pass or transmit through a first channel, and the cAWG causes an optical signal output from each transponder to pass through the first channel at one of the first side ports, outputs and transmits the passing optical signal to the light transmission path in a cyclic relation determined in accordance with a corresponding second side port among the plurality of second side ports and the wavelength of the output optical signal from the transponder, causes the optical signal transmitted through the light transmission path to pass through the first channel at one of the second side ports, and outputs the passing optical signal to the transponder in a cyclic relation determined in accordance with the first side port among the plurality of first side ports and the wavelength of the output optical signal from the transponder.

With this configuration, transponder signals of a plurality of different wavelengths can pass through channels at the first and second side ports of the cAWG. The cAWG causes an optical signal from the transponder to pass through the first channel at the first side ports, and outputs and transmits the passing optical signal to the light transmission path in a cyclic relation determined in accordance with a corresponding first side port among the plurality of second side ports and the wavelength of the output optical signal from the transponder. In the opposite direction, the optical signal transmitted the light transmission path can be caused to pass through the first channel at one of the second side ports, and the passing optical signal can be output to the transponder in a cyclic relation determined in accordance with the first side port among the plurality of first side ports and the wavelength of the output optical signal from the transponder.

Thus, when the wavelength (for example, a wavelength $\lambda 1$) of a transponder signal from the transponder is changed to another wavelength $\lambda 4$, similarly to the transponder signal of the wavelength $\lambda 1$ before the change, the transponder signal of the wavelength $\lambda 4$ after the change can be transmitted to an identical light transmission path through the first and second side ports of the cAWG. Accordingly, a transponder signal as an optical signal from a transponder can be output to the same path at an optional wavelength without change of physical wiring between the optical add/drop multiplexer and the transponder device. Thus, the optical add/drop multiplexer of the present invention does not use a multicast switch nor an amplifier configured to compensate light loss, which leads to reduction of device cost and electric power consumption thereof.

An invention according to claim 2 is the optical add/drop multiplexer according to claim 1, further including an optical switch (SW) unit configured to transmit or cut off, when the light transmission path includes a different light transmission path, an optical signal between the different light transmission path and the cAWG, and when the wavelength of a transponder signal as an optical signal from each transponder is changed to a different wavelength, the light SW unit transmits the transponder signal of the changed wavelength to the different light transmission path.

With this configuration, an optical signal from the transponder can be output through an optional path, in other words, a different path without change of physical wiring between the optical add/drop multiplexer and the transponder device.

An invention according to claim 3 is the optical add/drop multiplexer according to claim 2 in which when a plurality of the cAWGs and a plurality of the transponders are provided, the light SW unit transmits, to different light transmission paths, transponder signals having an identical wavelength, transmitted from different transponders, and having passed through the first channels at different cAWGs.

With this configuration, output to a path different from an existing path can be performed at the same wavelength from different transponders without change of physical wiring between the optical add/drop multiplexer and the transponder device.

An invention according to claim 4 is the optical add/drop multiplexer according to any one of claims 1 to 3 in which a 1×N optical coupler that includes a port connectable with a port of the cAWG and includes ports connectable with a plurality of the transponders is connected between the cAWG and the transponder, and an optical amplifier is connected between the cAWG and the 1×N optical coupler.

With this configuration, the 1×N optical coupler can be connected with N transponders, and thus the number of transponders connectable with the cAWG can be increased. In this case, a signal loss through N drops at the 1×N optical coupler can be canceled through signal amplification at the optical amplifier.

An invention according to claim 5 is the optical add/drop multiplexer according to claim 2 or 3 in which the light SW unit includes a wavelength selective switch (WSS) configured to perform multiplexing-demultiplexing of the wavelength of an optical signal transmitted to the light transmission path and path switching of the optical signal, and the cAWG is connected in parallel with the WSS.

With this configuration, an additional cAWG can be connected in parallel with the WSS, and thus another transponder can be connected with the additional cAWG. Accordingly, the number of connectable transponders can be increased.

An invention according to claim 6 is the optical add/drop multiplexer according to any one of claims 1 to 3, further including a 1×N optical coupler that includes a port connected with the cAWG, includes ports connectable with a plurality of the transponders, and is connected between the cAWG and the transponder, N ports of the 1×N optical coupler are connected with a multi carrier optical path transponder including a plurality of transmission ports and a plurality of reception ports, and the optical coupler or the 1×N optical coupler is connected with a single carrier optical path transponder.

With this configuration, a single carrier optical path and a multi carrier optical path can be provided in mixture. In this case, when a multi carrier optical signal in which optical signals having a plurality of kinds of wavelengths are superimposed is transmitted from the multi carrier optical path transponder, a signal having a larger number of wavelengths can be input to an identical AWG port, and thus large-volume data transmission can be performed through one path. An optical signal transmitted from the multi carrier optical path transponder connected with the N ports of the 1×N optical coupler may be divided into optical signals having a plurality of kinds of wavelengths, and the divided optical signals may be transmitted to different light transmission paths. In this case, the number of optical signals superimposed in one multi carrier optical signal is smaller, but data transmission can be performed through a plurality of systems when the transmission is performed through different light transmission paths.

An invention according to claim 7 is a light transmission system including: the optical add/drop multiplexer according to any one of claims 1 to 6; and a monitoring control device separately connected with the optical add/drop multiplexer and configured to instruct optical path generation control and wavelength change control to the optical add/drop multiplexer, and the optical add/drop multiplexer includes a monitoring control unit configured to perform the instructed optical path generation control and wavelength change control to generate an optical path and change the wavelength of an optical signal in the optical add/drop multiplexer.

With this configuration, for example, the wavelength of an optical signal transmitted from a transponder can be changed to a different wavelength under remote control by the monitoring control device without change of physical wiring between the optical add/drop multiplexer and the transponder device.

An invention according to claim 8 is the light transmission system according to claim 7 in which the optical add/drop multiplexer includes an optical coupler connected with a light transmission path and configured to bifurcate or connect an optical signal, and an optical amplifier connected with an input-output side of the optical coupler, and when input power of the optical amplifier or the number of wavelength of an input optical signal deviates by a predetermined value or more from input power or the number of wavelength of an input optical signal at path generation control, which is instructed by the monitoring control device, the monitoring control unit performs control to stop output from a transponder that transmits and receives optical signals to and from the optical coupler.

With this configuration, when unintentional change occurs to the wavelength of an output optical signal from the transponder, it is possible to prevent the optical signal from being output to a different path and causing a penalty due to collision and crosstalk with another optical signal.

Effects of the Invention

According to the present invention, it is possible to provide an optical add/drop multiplexer having reduced device cost and electric power consumption and a light transmission system using the optical add/drop multiplexer.

BRIEF DESCRIPTION OF DRAWINGS

FIG. 7 is a diagram illustrating a table configuration of a wavelength use management table stored in a DB in the monitoring control device in the light transmission system of the present embodiment.

DESCRIPTION OF EMBODIMENTS

An embodiment of the present invention will be described below with reference to the accompanying drawings. In all drawings of the present specification, components having functions corresponding to each other are denoted by an identical reference sign, and description thereof is omitted as appropriate.

<Configuration of Embodiment>

Figure 1:
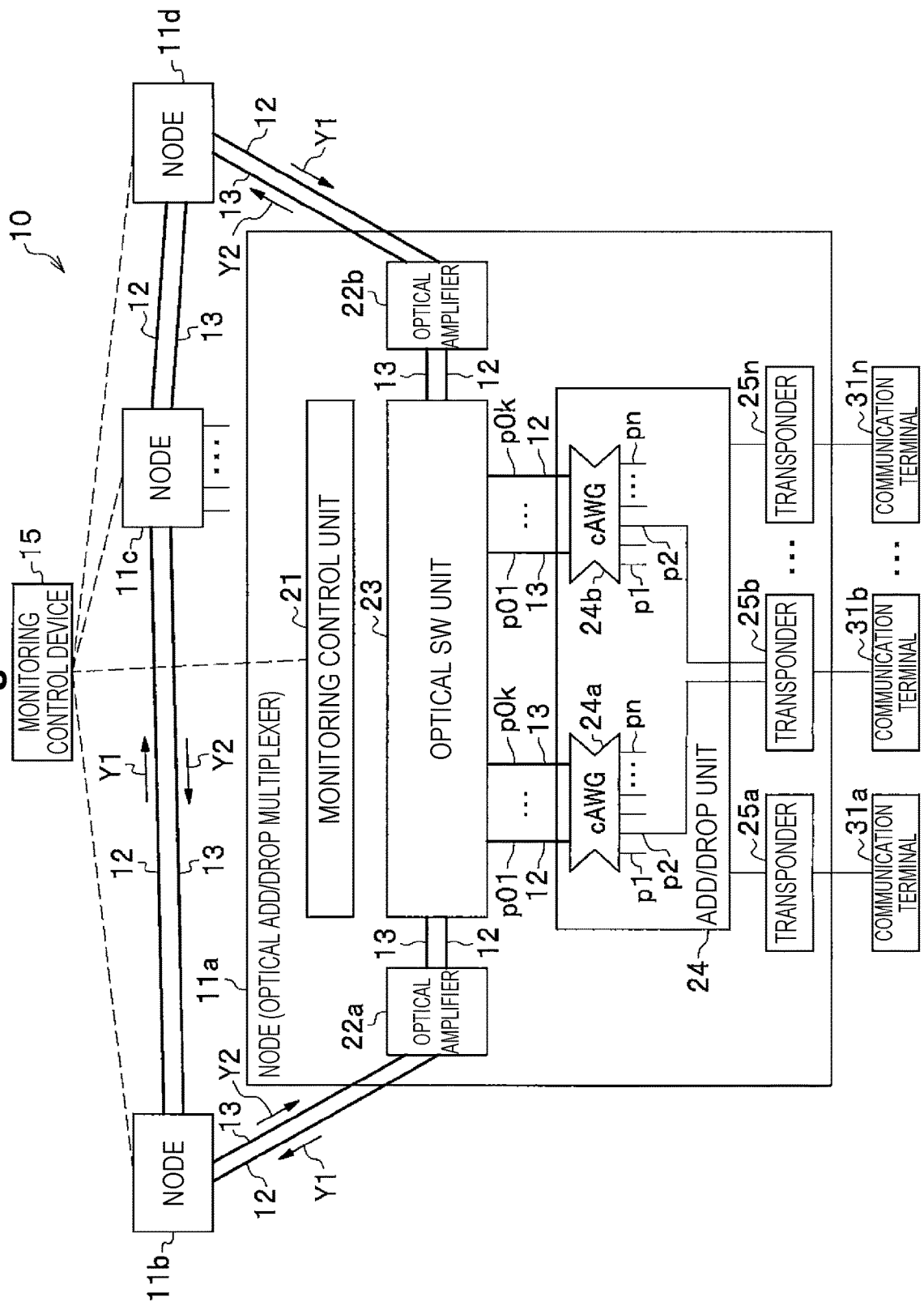
FIG. 1 is a block diagram illustrating the configuration of a light transmission system using an optical add/drop multiplexer according to an embodiment of the present invention.

FIG. 1 is a block diagram illustrating the configuration of a light transmission system using an optical add/drop multiplexer according to the embodiment of the present invention.

This light transmission system 10 illustrated in FIG. 1 has a configuration in which nodes 11*a*, 11*b*, 11*c*, and 11*d* as the optical add/drop multiplexers are connected with one another in a ring shape through optical fibers 12 and 13 as two light transmission paths. Data can be transmitted through the optical fibers 12 and 13 in opposite directions or an identical direction, for example, in the clockwise direction (direction of an arrow Y1) as an active system and/or the counterclockwise direction (direction of an arrow Y2) as a redundant system.

The nodes 11*a* to 11*d* each have an identical configuration including a monitoring control unit 21, optical amplifiers 22*a* and 22*b*, an optical switch (SW) unit 23, an add/drop unit 24, and a plurality of transponders 25*a*, 25*b*, . . . , and 25*n* as illustrated representatively with the node 11*a*. The monitoring control unit 21 is connected with an external monitoring control device 15 configured to monitor and control the corresponding one of the nodes 11*a* to 11*d*. The transponders 25*a*, 25*b*, . . . , and 25*n* are connected with external communication terminals 31*a*, 31*b*, . . . , and 31*n* such as personal computers.

However, FIG. 1 illustrates a configuration in which each transponder (for example, the transponder 25a) is connected with one communication terminal 31a, but the one transponder 25a may be connected with a plurality of communication terminals 31a.

The add/drop unit 24 includes a plurality (two) of cyclic arrayed waveguide gratings (cAWGs) 24a and 24b. The cAWGs 24a and 24b each have an input-output side port configuration of K input-outputs×N input-outputs (expressed as K×N), including K ports p01, . . . , and p0k on the K input-output side and N ports p1, p2, p3, p4, . . . , and pn on the N input-output side. The ports p1 to pn on the N input-output side are also referred to as first side ports p1 to pn, and the ports p01 to p0k on the K input-output side are also referred to as second side ports p01 to p0k.

In the example illustrated in FIG. 1, the second side ports p01 and p0k of the cAWG 24a are connected with the optical fibers 12 and 13 through the light SW unit 23, and the first side port p2 is connected with a port of the transponder 25b. The second side ports p01 and p0k of the cAWG 24b are connected with the optical fibers 13 and 12 through the light SW unit 23, and the first side port p3 is connected with another port of the transponder 25b.

Figure 2:
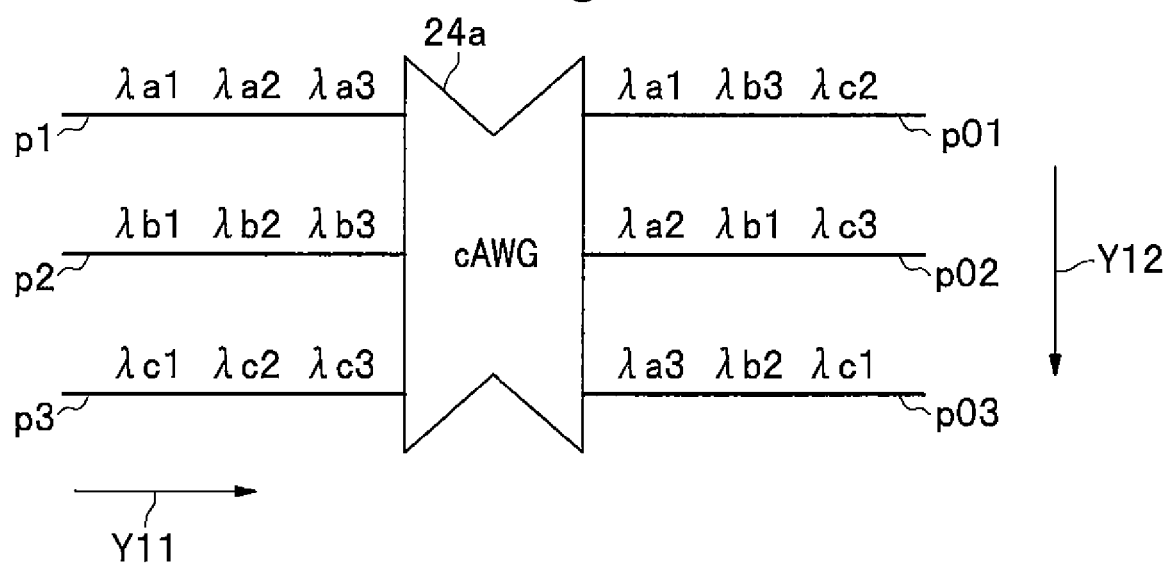
FIG. 2 is an explanatory diagram of functions (characteristics) of a cAWG.

Functions (characteristics) of the cAWG 24a and the cAWG 24b will be described below with reference to FIG. 2. FIG. 2 representatively illustrates the cAWG 24a as a description target, the second side ports p01 to p03 are three ports, and the first side ports p1 to p3 are three ports. The first side ports p1 to p3 are connected with any three of the transponders 25a to 25n, and the second side ports p01 to p03 are connected with any of the optical fibers 12 and 13 through the light SW unit 23 (FIG. 1).

In the cAWG 24a, bands of wavelengths $\lambda a1$, $\lambda a2$, and $\lambda a3$ of frequencies different from one another are allocated to the first side port p1 in a lateral direction illustrated with an arrow Y11. In a longitudinal direction illustrated with an arrow Y12, the band of the wavelength $\lambda a1$ is allocated to the second side port p01, the band of the wavelength $\lambda a2$ is allocated to the second side port p02, and the band of the wavelength $\lambda a3$ is allocated to the third side port p03.

Similarly, bands of wavelengths $\lambda b1$, $\lambda b2$, and $\lambda b3$ as bands different from one another are allocated to the first side port p2. The band of the wavelength $\lambda b3$ is allocated to the second side port p01, the band of the wavelength $\lambda b1$ is allocated to the second side port p02, and the band of the wavelength $\lambda b2$ is allocated to the third side port p03.

Similarly, bands of wavelengths $\lambda c1$, $\lambda c2$, and $\lambda c3$ as bands different from one another are allocated to the first side port p3. The band of the wavelength $\lambda c2$ is allocated to the second side port p01, the band of the wavelength $\lambda c3$ is allocated to the second side port p02, and the band of the wavelength $\lambda c1$ is allocated to the third side port p03.

Figure 3:
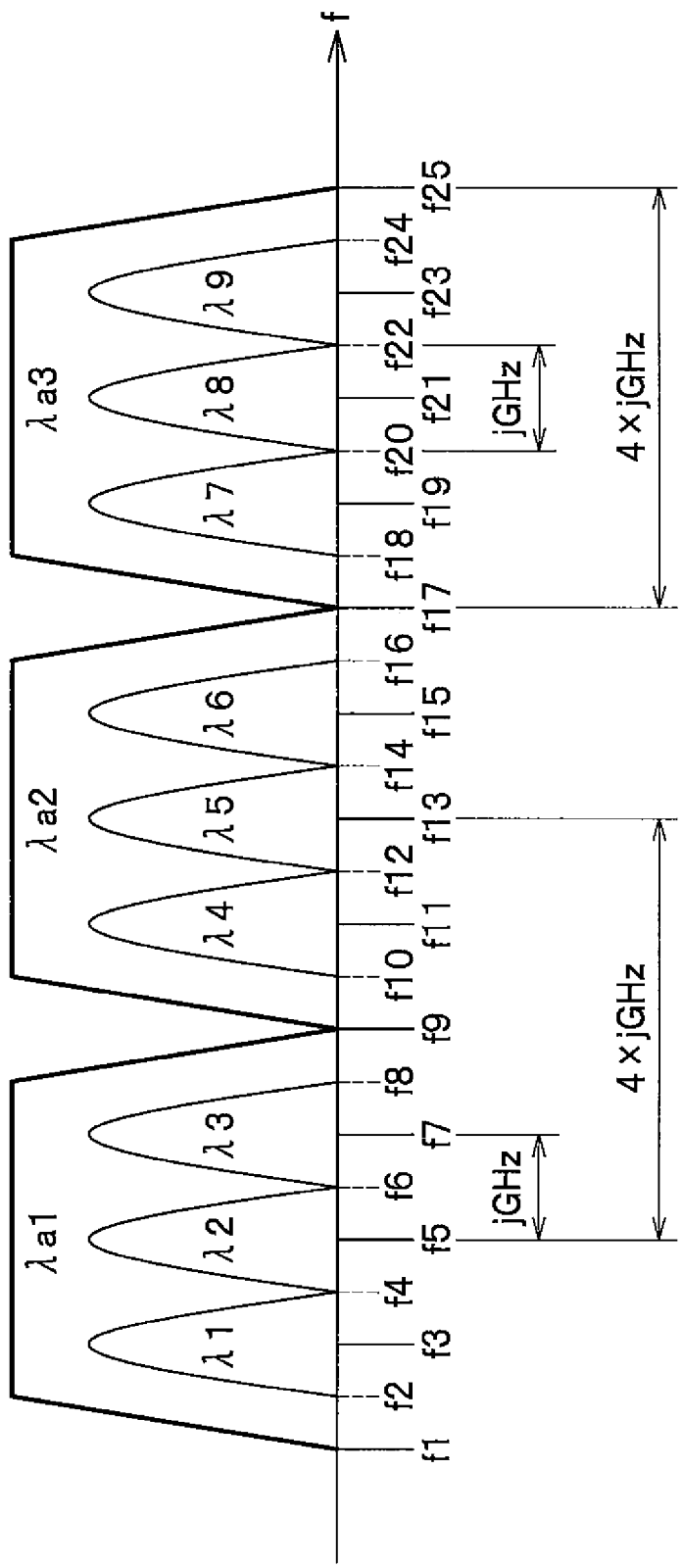
FIG. 3 is a diagram illustrating the waveform of a wavelength corresponding to the channel interval of ports of the cAWG and the waveform of a wavelength corresponding to the channel interval of ports at a transponder.

As illustrated in FIG. 3, AWG transmission bands of the first side ports p1 to p3 and the second side ports p01 to p03 of the cAWG 24a are bandwidths f1 to f9, bandwidths f9 to f17, and bandwidths f17 to f25 of three wavelengths (also referred to as cAWG wavelengths) $\lambda a1$, $\lambda a2$, and $\lambda a3$. The bandwidth of one wavelength $\lambda c1$ is m times (a plurality of times or multiples) as large as a bandwidth corresponding to an optical signal input-output channel interval at a port of each of the transponders 25a to 25n. Optical signals input to and output from the transponders 25a to 25n are also referred to as transponder signals. The channel interval of the cAWG 24a corresponds to a first channel interval described in the claims. The channel interval of each transponder corresponds to a second channel interval described in the claims.

The bandwidth (in other words, filter passband) of each of the cAWG wavelengths $\lambda a1$ to $\lambda a3$ is, for example, 4×jGHz, which is four times larger than a bandwidth jGHz of a transponder wavelength $\lambda 8$ as representatively illustrated with the waveform of the cAWG wavelength $\lambda a3$.

For example, the bandwidth of the cAWG wavelength $\lambda a1$ includes transponder signal bandwidths of three different wavelengths $\lambda 1$ to $\lambda 3$, the bandwidth of the cAWG wavelength $\lambda a2$ includes transponder signal bandwidths of three different wavelengths $\lambda 4$ to $\lambda 6$, and the bandwidth of the cAWG wavelength $\lambda a3$ includes transponder signal bandwidths of three different wavelengths $\lambda 7$ to $\lambda 9$.

The channel interval of the cAWG wavelengths $\lambda a1$ to $\lambda a3$ is 4×jGHz, which is representatively illustrated between a central frequency f5 of the wavelength $\lambda a1$ and a central frequency f13 of the wavelength $\lambda a2$. The channel interval 4×jGHz is four times larger than a channel interval jGHz between the central frequency f5 of a transponder wavelength $\lambda 2$ and a central frequency f7 of a transponder wavelength $\lambda 3$.

The cAWG 24a has a function to regularly and cyclically output, through the second side ports p01, p02, and p03, transponder signals input through the first side port p1 and having passed (or transmitted) through the bandwidths of the three wavelengths $\lambda a1$ to $\lambda a3$. This is same for the other ports.

Conversely, the cAWG 24a has a function to regularly and cyclically output, through the band of the wavelength $\lambda a1$ of the first side port p1, optical signals input through the second side port p01 and having passed through the bandwidths of the three wavelengths $\lambda a1$, $\lambda b3$, and $\lambda c2$, output the optical signals through the band of the wavelength $\lambda b3$ of the first side port p2, and output the optical signals through the band of the wavelength $\lambda c2$ of the first side port p3. This is same for the other ports.

Figure 4:
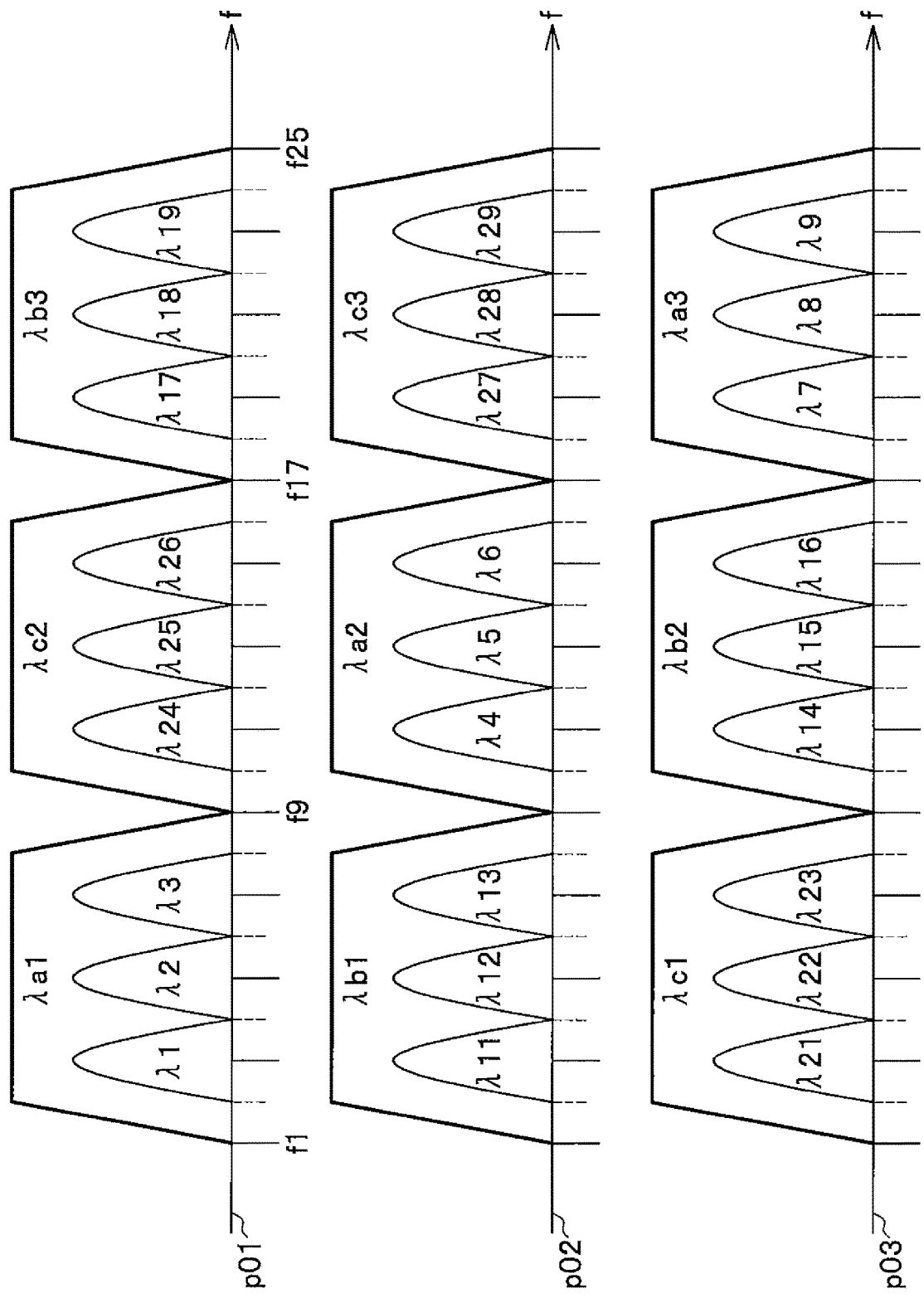
FIG. 4 is a diagram illustrating the wavelengths of optical signals output from three output ports of the cAWG illustrated in FIG. 2.

The bandwidths of cAWG wavelengths output from the second side ports p01 to p03 of the cAWG 24a illustrated in FIG. 2 are illustrated in FIG. 4 and described below.

Transponder wavelengths that can pass through the bandwidths of the cAWG wavelengths $\lambda a1$ to $\lambda a3$ input to the first side port p1 illustrated in FIG. 2 are $\lambda 1$ to $\lambda 9$ illustrated in FIG. 3. It is assumed that transponder wavelengths that can pass through the bandwidths of the cAWG wavelengths $\lambda b1$ to $\lambda b3$ of the first side port p2 in FIG. 2 are a set of $\lambda 11$, $\lambda 12$, and $\lambda 13$, a set of $\lambda 14$, $\lambda 15$, and $\lambda 16$, and a set of $\lambda 17$, $\lambda 18$, and $\lambda 19$, respectively. It is assumed that transponder wavelengths that can pass through the bandwidths of the cAWG wavelengths $\lambda c1$ to $\lambda c3$ of the first side port p3 are a set of $\lambda 21$, $\lambda 22$, and $\lambda 23$, a set of $\lambda 24$, $\lambda 25$, and $\lambda 26$, and a set of $\lambda 27$, $\lambda 28$, and $\lambda 29$, respectively.

In FIG. 4, the bandwidths of the cAWG wavelengths of the second side port p01 of the cAWG 24a are disposed in the order of $\lambda a1$, $\lambda c2$, and $\lambda b3$ on the axis of a frequency f as follows. Specifically, the wavelength $\lambda a1$ through which the transponder wavelengths $\lambda 1$ to $\lambda 3$ can pass is disposed across the band of the frequencies f1 to f9. The wavelength $\lambda c2$ through which the transponder wavelengths $\lambda 24$ to $\lambda 26$ can pass is disposed across the band of the frequencies f9 to f17. The wavelength $\lambda b3$ through which the transponder wavelengths $\lambda 17$ to $\lambda 19$ can pass is disposed across the band of the frequencies f17 to f25.

The bandwidths of the cAWG wavelengths of the second side port p02 of the cAWG 24a are disposed in the order of $\lambda b1$, $\lambda a2$, and $\lambda c3$ on the axis of the frequency f as follows. Specifically, the wavelength $\lambda b1$ through which the transponder wavelengths kll to $\lambda 13$ can pass is disposed across the band of the frequencies f1 to f9. The wavelength $\lambda a2$ through which the transponder wavelengths λ4 to λ6 can pass is disposed across the band of the frequencies f9 to f17. The wavelength λc3 through which the transponder wavelengths λ27 to λ29 can pass is disposed across the band of the frequencies f17 to f25.

The bandwidths of the cAWG wavelengths of the second side port p03 of the cAWG 24a are disposed in the order of λc1, λb2, and λa3 on the axis of the frequency f as follows. Specifically, the wavelength λc1 through which the transponder wavelengths λ21 to λ23 can pass is disposed across the band of the frequencies f1 to f9. The wavelength λb2 through which the transponder wavelengths λ14 to λ16 can pass is disposed across the band of the frequencies f9 to f17. The wavelength λa3 through which the transponder wavelengths λ7 to λ9 can pass is disposed across the band of the frequencies f17 to f25.

Transmission paths can be changed without wavelength collision by changing the wavelengths λ1 to λ29 of optical signals transmitted from the transponders 25a to 25n (FIG. 1). In change of the transponder wavelengths λ1 to λ29, for example, the wavelength λ1 can be changed to the wavelength λ2 under wavelength change control by the monitoring control unit 21 while the transponders 25a to 25n are connected with the first side ports p1 to p3 of the cAWG 24a. The wavelength change control is instructed by the monitoring control device 15.

Figure 5:
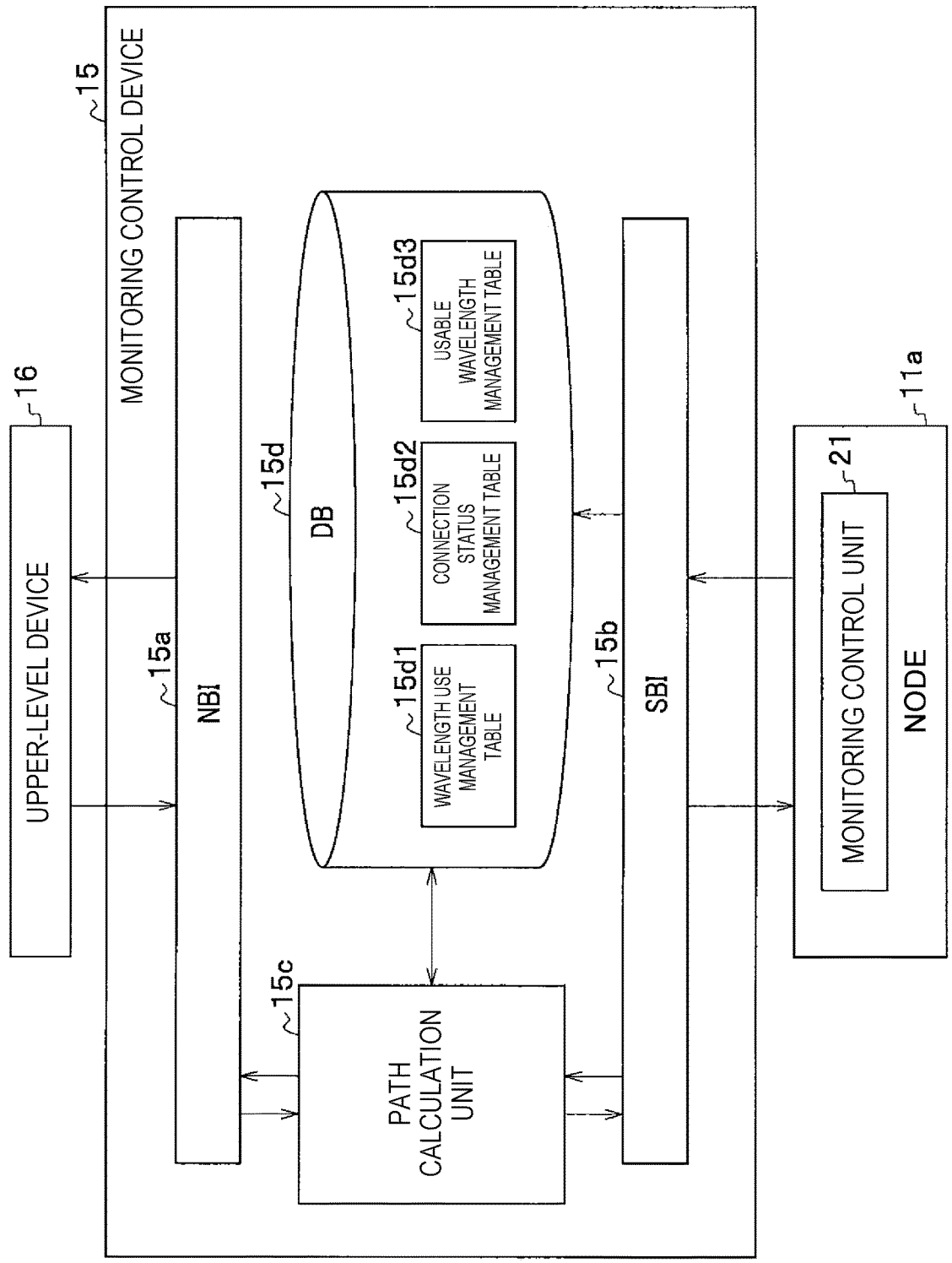
FIG. 5 is a block diagram illustrating the configuration of a monitoring control device in a light transmission system of the present embodiment.

Subsequently, the monitoring control device 15 will be described below with reference to FIG. 5. FIG. 5 illustrates the node 11a as a representative of the nodes 11a to 11d (FIG. 1).

The monitoring control device 15 is configured as an element management system (EMS) or the like configured to manage instruments (elements) such as the nodes 11a to 11d included in a network. In a case of the EMS, a higher-level device 16 connected at a higher level of the monitoring control device 15 is a network management system (NMS) configured to manage the network. The NMS performs processing of collecting and managing information related to equipment included in the network and settings thereof, monitoring and recording the status of data flowing in the network, the operation situation of each instrument, and the like, and giving notification to an administrator when anomaly or a presage thereof is sensed.

The monitoring control device 15 is disposed separately from the node 11a in a remote manner or the like and instructs optical path generation control, wavelength change control, and the like to the monitoring control unit 21 of the node 11a. The monitoring control device 15 includes a north-bound interface (NBI) 15a, a south-bound interface (SBI) 15b, a path calculation unit 15c, and a database (DB) 15d. The NBI 15a is an interface for the higher-level device 16. The SBI 15b is an interface for a lower-level device (in this example, the node 11a).

The DB 15d stores a wavelength use management table 15d1, a connection status management table 15d2, and a usable wavelength management table 15d3. These tables are also referred to as management tables 15d1, 15d2, and 15d3.

Figure 6:
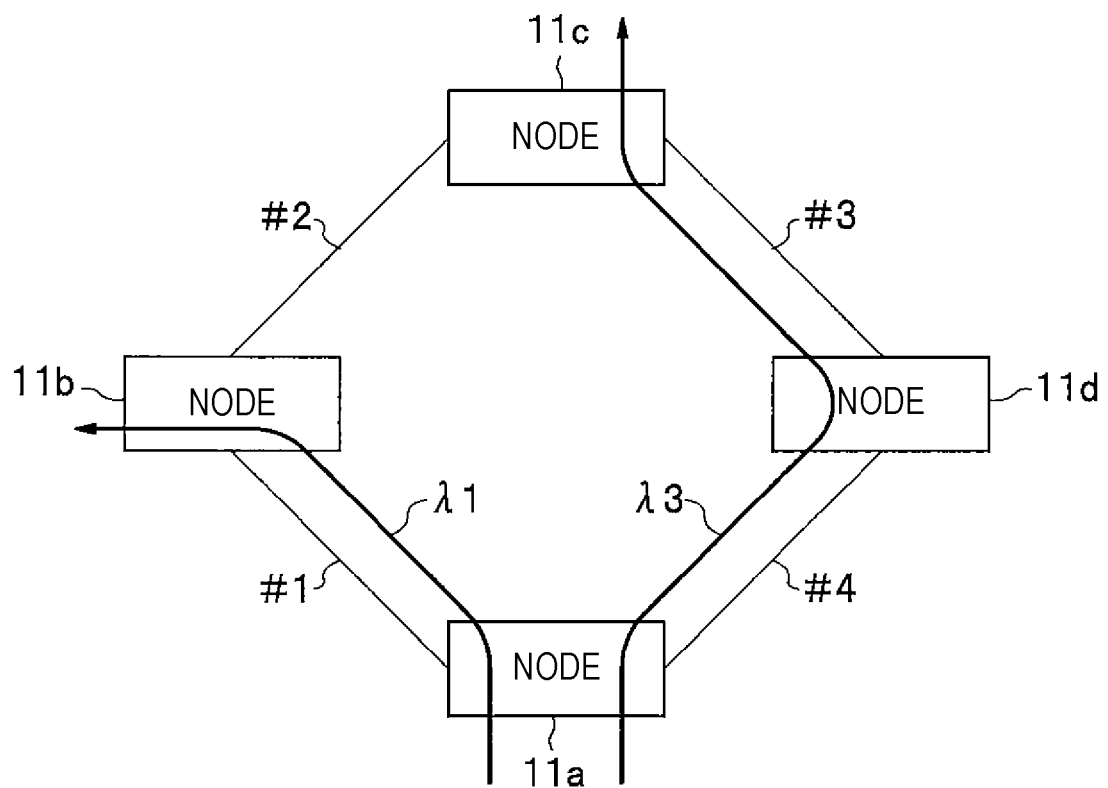
FIG. 6 is a block diagram illustrating the number of each link between connected nodes and the use state of each wavelength in the light transmission system of the present embodiment.

The wavelength use management table 15d1 manages a wavelength use status of each link by the optical fibers 12 and 13 as follows. For example, it is assumed that the nodes 11a to 11d have link numbers #1, #2, #3, and #4 as illustrated in FIG. 6. In this case, an optical signal of the wavelength λ1 is transmitted from the node 11a via the link #1 and passes through the node 11b. In addition, it is assumed that an optical signal of the wavelength λ3 is transmitted from the node 11a via the link #4 and the node 11d and then via the link #3 and passes through the node 11c.

FIG. 7 illustrates the management table 15d1 that manages the wavelength use status of each of the links #1 to #4 in this case. The management table 15d1 has a matrix configuration having the link numbers #1, #2, #3, and #4 in columns and having the wavelength λ1, λ2, λ3, λ4, . . . in rows. In a case of the wavelength use status of each link, which is illustrated in FIG. 6, the management table 15d1 indicates that the wavelength λ1 is "in use" at the link number #1 and "available" at the other link numbers #2 to #4. It is indicated that the wavelength 22 is "available" at all link numbers #1 to #4. It is indicated that the wavelength λ3 is "available" at the link numbers #1 and #2 and "in use" at the link numbers #3 and #4. It is indicated that the wavelength λ4 is "available" at all link numbers #1 to #4. In this manner, the management table 15d1 manages the wavelength use status of each of the links #1 to #4.

Back in FIG. 5, the connection status management table 15d2 manages the connection statuses of the add/drop unit 24 and the transponders 25a to 25n of each of the nodes 11a to 11d (FIG. 1). The usable wavelength management table 15d3 manages usable wavelengths for respective paths of the transponders 25a to 25n in each of the nodes 11a to 11d.

The path calculation unit 15c performs calculation to be described later when optical path generation control, wavelength change control, or the like is requested by the higher-level device 16 through the NBI 15a. The request is also performed by a person such as the administrator.

Specifically, the path calculation unit 15c reads, from the management tables 15d1 to 15d3 stored in the DB 15d, the number of available wavelengths of each link for the optical fibers 12 and 13, the path of each of the transponders 25a to 25n (FIG. 1), and the number of usable wavelengths, and performs calculation that allocates an optical path using available optical paths (the optical fibers 12 and 13) and available wavelengths based on the read information.

In addition, the path calculation unit 15c sends, to the monitoring control unit 21 of each of the nodes 11a to 11d through the SBI 15b in accordance with a result of the calculation, an instruction for setting a path through the nodes 11a to 11d and use wavelengths, such as an instruction of transmission wavelengths to the transponders 25a to 25n.

Through control in accordance with the setting instruction, the monitoring control unit 21 sets paths and usable wavelengths of the transponders 25a to 25n and then sends setting change complete notification to the monitoring control device 15. The contents of the notification are stored in the management tables 15d1 to 15d3.

The monitoring control device 15 thus configured can achieve a CDC function at low cost, but has constraints on wavelengths selectable for each transponder output path, depending on characteristics and connection ports of the cAWGs 24a and 24b connected with each of the transponders 25a to 25n.

Specifically, the number of optical paths that can be accommodated decreases when simple accommodation designing that, for example, optical paths are sequentially set with priorities in ascending order of the wavelength number is performed without sufficient consideration on the connection status and optical path accommodation status of the transponders 25a to 25n at each of the nodes 11a to 11d. In addition, there is another defect designing man-hour significantly increases when optical path accommodation designing is manually performed with consideration on various factors.

Thus, to avoid these defects, the monitoring control device 15 of the present embodiment can manage available wavelength resources and usable wavelengths at the nodes 11a to 11d and recommend or automatically set use wavelengths in response to a request for optical path generation and change.

Figure 8:
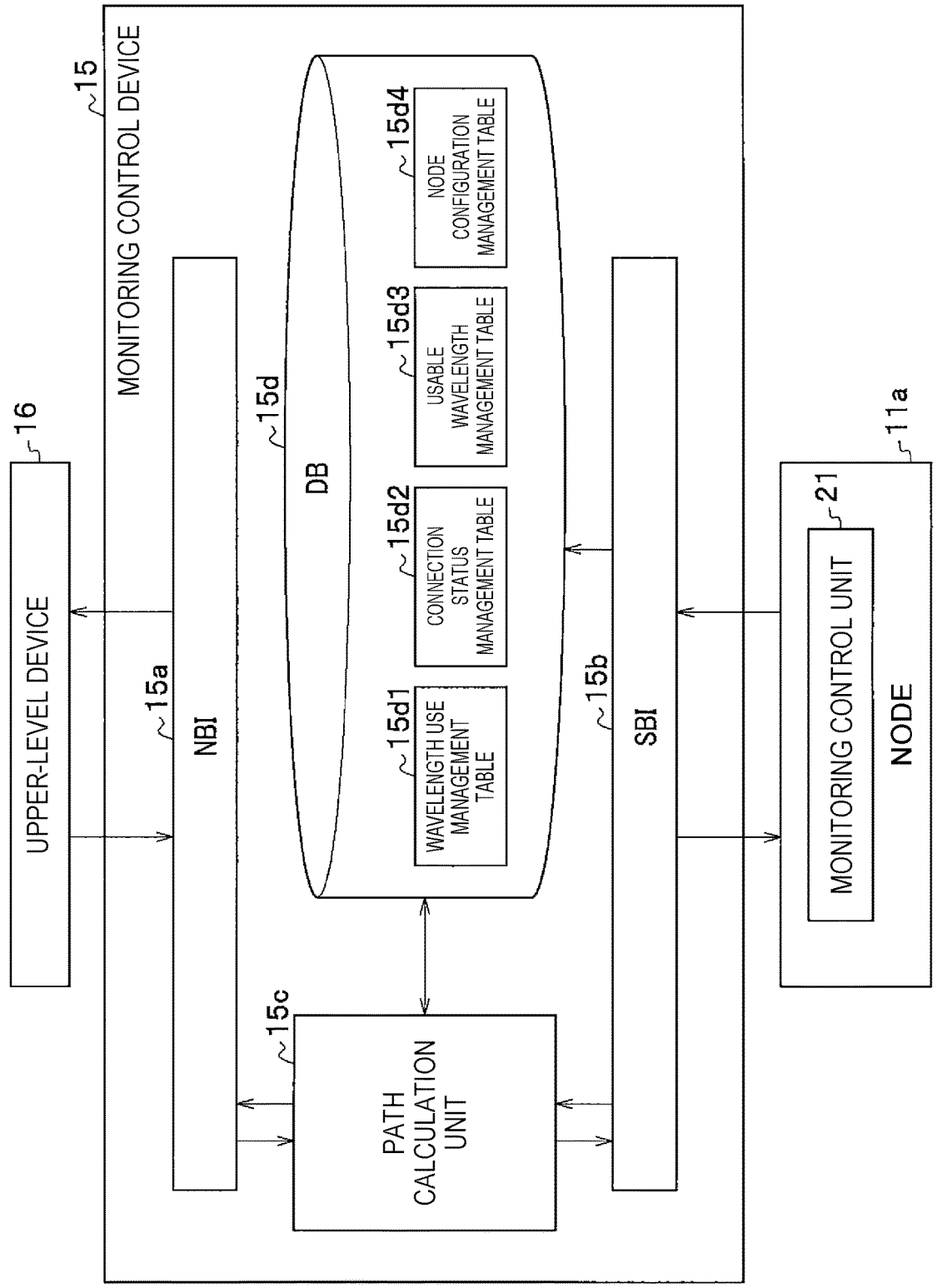
FIG. 8 is a block diagram illustrating another configuration of the monitoring control device in the light transmission system of the present embodiment.

In addition, as illustrated in FIG. 8, the monitoring control device 15 may further include a node configuration management table 15d4 in the DB 15d. The node configuration management table 15d4 manages a node type that indicates whether the nodes 11a to 11d are each a node without the CDC function, a node of the existing CDC function, or a node including the add/drop unit 24 of the present invention.

When optical path accommodation designing with the node type taken into consideration is performed in the light transmission system 10 in accordance with the management, a network including an existing ROADM and an existing CDC-ROADM in mixture at each of the nodes 11a to 11d (FIG. 1) can be achieved. Thus, a network can be flexibly established in accordance with physical topology and traffic situation.

<Exemplary Specific Configurations of Light SW Unit and Add/Drop Unit>

Figure 9:
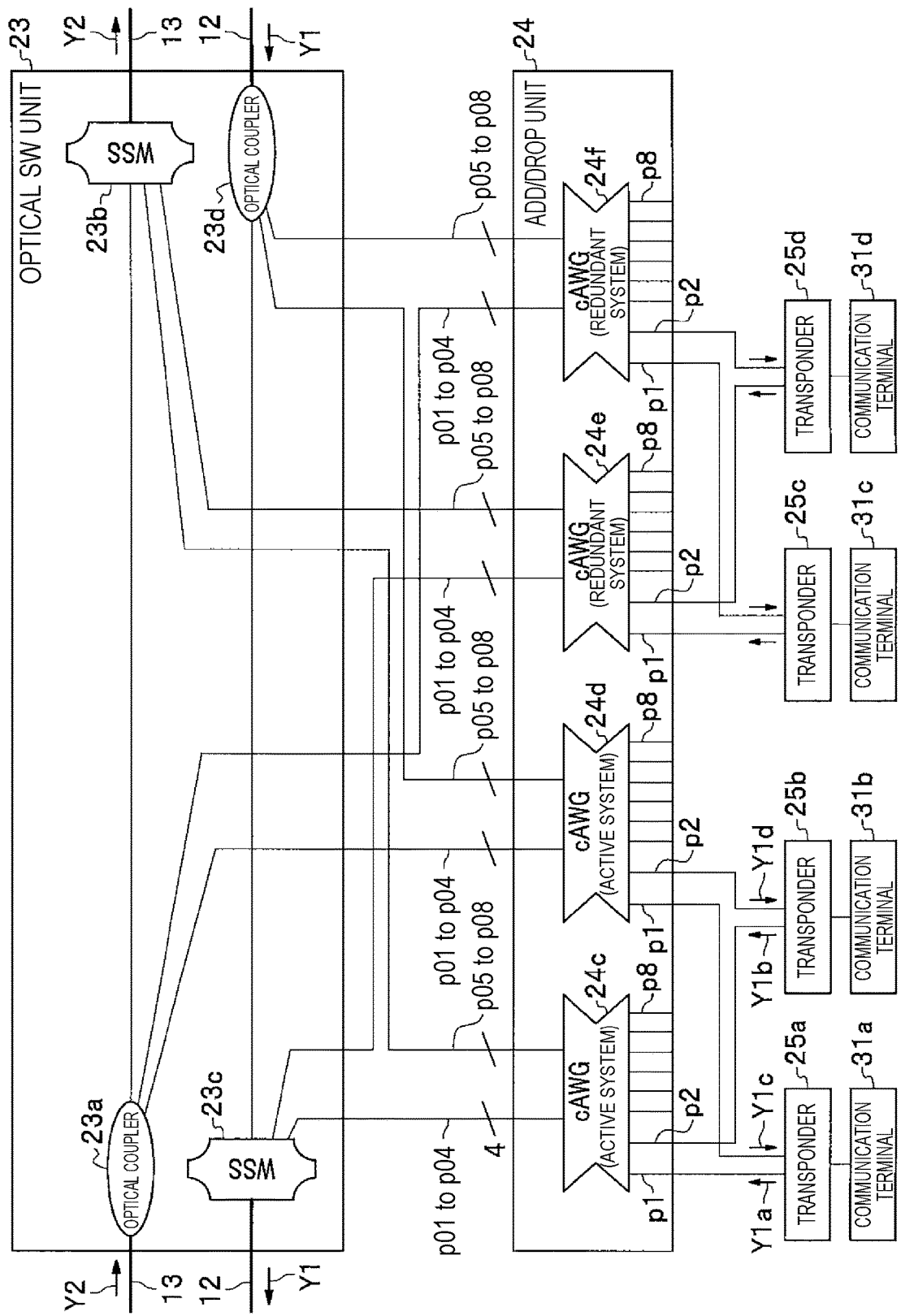
FIG. 9 is a block diagram illustrating specific configurations of a light SW unit and an add/drop unit in the light transmission system of the present embodiment.

FIG. 9 is a block diagram illustrating specific configurations of the light SW unit 23 and the add/drop unit 24 in the light transmission system 10 of the present embodiment.

The light SW unit 23 includes an optical coupler 23a interposed and connected with the one optical fiber 13, and a wavelength selective switch (WSS) 23b, and includes an optical coupler 23d interposed and connected with the other optical fiber 12, and a WSS 23c.

The WSSs 23b and 23c are each an optical switch that has a wavelength multiplexing-demultiplexing function to connect a wavelength-division-multiplexed WDM signal transmitted to the optical fibers 12 and 13 with a port different for each wavelength and is capable of changing a combination of a wavelength and a port under remote control by the monitoring control device 15. The WSSs 23b and 23c each also have an attenuation function to adjust a transmitted light power level for each wavelength.

When such WSSs 23b and 23c are used, wire switching at an on-site node is unnecessary at change of a transmission-reception wavelength, for example, from $\lambda 1$ to $\lambda 2$, and fast path change can be performed through a remote operation. This processing function achieves the above-described color-less function as the first function because a signal path inside a node has no constraints due to the wavelength (color) of an optical signal.

The add/drop unit 24 includes an active-system cAWG 24c and a redundant-system cAWG 24e that are used as an add function (add unit), and an active-system cAWG 24d and a redundant-system cAWG 24f that are used as a drop function (drop unit).

The 8×8 cAWGs 24c and 24e and the 8×8 cAWGs 24d and 24f each include the second side ports p01 to p04 and p05 to p08 and the first side ports p1 to p8. Transponder signals of the wavelengths $\lambda 1$ to $\lambda 29$ (refer to FIG. 4) can pass through the bandwidths of the cAWG wavelengths of each of the first side ports p1 to p8.

It is assumed that the bandwidth of one cAWG wavelength is 400 GHz and the channel interval of transmission bands of the eight ports p01 to p08 and the eight ports p1 to p8 on the respective input-output sides is 400 GHz. It is assumed that the bandwidth of each transponder signal is 50 GHz and the channel interval of transponder signals is 50 GHz.

In the active-system cAWG 24c, the second side ports p01 to p04 are connected with a port of the WSS 23c on the optical fiber 12 side, and the second side ports p05 to p08 are connected with a port of the WSS 23b on the optical fiber 13 side. In the cAWG 24c, the first side port p1 is connected with a transmission side port of the transponder 25a, and the first side port p2 is connected with a transmission side port of the transponder 25b.

In the active-system cAWG 24d, the second side ports p01 to p04 are connected with the optical coupler 23a on the optical fiber 13 side, and the second side ports p05 to p08 are connected with the optical coupler 23d on the optical fiber 12 side. In the cAWG 24d, the first side port p1 is connected with a reception side port of the transponder 25a, and the first side port p2 is connected with a reception side port of the transponder 25b.

In the redundant-system cAWG 24e, the second side ports p01 to p04 are connected with a port of the WSS 23c on the optical fiber 12 side, and the second side ports p05 to p08 are connected with a port of the WSS 23b on the optical fiber 13 side. In the cAWG 24e, the first side port p1 is connected with a transmission side port of the transponder 25c, and the first side port p2 is connected with a transmission side port of the transponder 25d.

In the redundant-system cAWG 24f, the second side ports p01 to p04 are connected with the optical coupler 23a on the optical fiber 13 side, and the second side ports p05 to p08 are connected with the optical coupler 23d on the optical fiber 12 side. In the cAWG 24f, the first side port p1 is connected with a reception side port of the transponder 25c, and the first side port p2 is connected with a reception side port of the transponder 25d.

In such a configuration, under remote control of WSSs 23a and 23b by the monitoring control device 15, an optical signal of an optional wavelength can be transmitted or cut off between the transponders 25a to 25d and the optical fibers 12 and 13 through the add/drop unit 24 as follows. In this case, wavelength change control of the transponders 25a to 25d is performed under remote control by the monitoring control device 15. However, the present description will be made on the active system.

Specifically, it is assumed that, for example, an optical signal (transponder signal) of the wavelength $\lambda 1$ is output from the transponder 25a in a direction indicated with an arrow Y1a. The optical signal of the wavelength $\lambda 1$ is input to the port p1 of the cAWG 24c and output from the port p01 to the WSS 23c on the optical fiber 12 side. When the WSS 23c is controlled to transmit the wavelength $\lambda 1$, the WSS 23c transmits the optical signal of the wavelength $\lambda 1$ to the fiber 12 in the direction indicated with the arrow Y1. When the WSS 23c is controlled to cut off the wavelength $\lambda 1$, the WSS 23c cuts off the optical signal of the wavelength $\lambda 1$.

This control of transmission or cutoff at the WSS 23c is similarly performed at the WSS 23b on the optical fiber 13 side. Specifically, for example, an optical signal of the wavelength $\lambda 4$ transmitted from the transponder 25b, which is illustrated with an arrow Y1b, is transmitted to the optical fiber 13 or cut off at the WSS 23b.

The optical coupler 23a on the optical fiber 13 side bifurcates, for example, an optical signal of the wavelength $\lambda 3$ transmitted through the optical fiber 13. The bifurcated optical signal of the wavelength $\lambda 3$ is input through the port p01 of the cAWG 24d and input to the transponder 25a through the port p1 as illustrated with an arrow Y1c. However, in a case in which the optical signal of the wavelength $\lambda 3$ is output from the port p2 of the cAWG 24d, the optical signal of the wavelength $\lambda 3$ is input to the transponder 25b as illustrated with an arrow Y1d.

Similarly, the optical coupler 23d on the optical fiber 12 side bifurcates, for example, an optical signal of the wavelength $\lambda 4$ transmitted through the optical fiber 12. The bifurcated optical signal of the wavelength λ4 is input to the port p01 of the cAWG 24d and input to the transponder 25a through the port p1 as illustrated with the arrow Y1c. However, in a case in which the optical signal of the wavelength λ4 is output from the port p2 of the cAWG 24d, the optical signal of the wavelength λ4 is input to the transponder 25d as illustrated with the arrow Y1d.

In such optical signal transmission, the monitoring control unit 21 performs wavelength change control on the nodes 11a to 11d in accordance with a wavelength change control instruction from the monitoring control device 15 as follows. For example, it is assumed that an optical signal of the wavelength λ1 is transmitted from the transponder 25a to the port p1 of the cAWG 24c as illustrated with the arrow Y1a. In this case, when the wavelength λ1 of the optical signal is changed to the wavelength λ4 at the transponder 25a and the WSS 23c being configured to transmit the wavelength λ1 is remotely controlled to transmit to the wavelength λ4, the optical signal of the wavelength λ4 after the wavelength change can be transmitted to a path (the arrow Y1) identical to that for the optical signal of the wavelength λ1 before the change.

In the cAWG 24c as a cAWG, as described above, optional transponder signals of, for example, the wavelengths λ1 to λ29 (refer to FIG. 4) can pass through the bandwidths of transmission wavelengths of the ports p1 to p8. Thus, when the wavelength λ1 of the optical signal from the transponder 25a is changed to the wavelength λ4 as described above, the optical signal of the wavelength λ4 after the change is transmitted from the WSS 23c to the same optical fiber 12 through the ports p1 and p01 of the cAWG 24c like the optical signal of the wavelength λ1 before the change.

Accordingly, with the above-described color-less function as the first function, an optical signal from a transponder can be output at a different wavelength to the same path without change of physical wiring.

When the wavelength λ1 of the optical signal from the transponder 25a is changed to a wavelength λx and the WSS 23b is changed to transmit the wavelength λx by wavelength change control, the optical signal of the wavelength λx after the change is transmitted from the WSS 23b to the optical fiber 13 through the ports p1 and p05 of the cAWG 24c in the direction of the arrow Y2.

However, as illustrated in FIG. 4, the transponder wavelength λ1 in the configuration in FIG. 9 passes through the bandwidth of the cAWG wavelength λa1 and is transmitted to the WSS 23c through the ports p1 and p01 of the cAWG 24c, and the transponder wavelength λx passes through the bandwidth of the cAWG wavelength λa2 and is transmitted to the WSS 23b through the ports p1 and p05 of the cAWG 24c.

Accordingly, with the above-described direction-less function as the second function, an optical signal from a transponder can be output through an optional path, in other words, a different path without change of physical wiring.

An optical signal of the wavelength λ1 is output from the one transponder 25a and transmitted to the WSS 23c through the ports p1 and p01 of the cAWG 24c as illustrated with the arrow Y1a. An optical signal of the same wavelength λ1 is output from the other transponder 25b and transmitted to the WSS 23b through the ports p2 and p05 of the cAWG 24c as illustrated with the arrow Y1b. In this case, the optical signals of the same wavelength λ1 are transmitted to the optical fibers 12 and 13 as different transmission paths through the different ports of the cAWG 24c, and thus do not collide.

Accordingly, with the above-described contention-less function as the third function, output to a path different from an existing path can be performed at the same wavelength from different transponders without change of physical wiring.

<Other Exemplary Specific Configurations of Light SW Unit and Add/Drop Unit>

Figure 10:
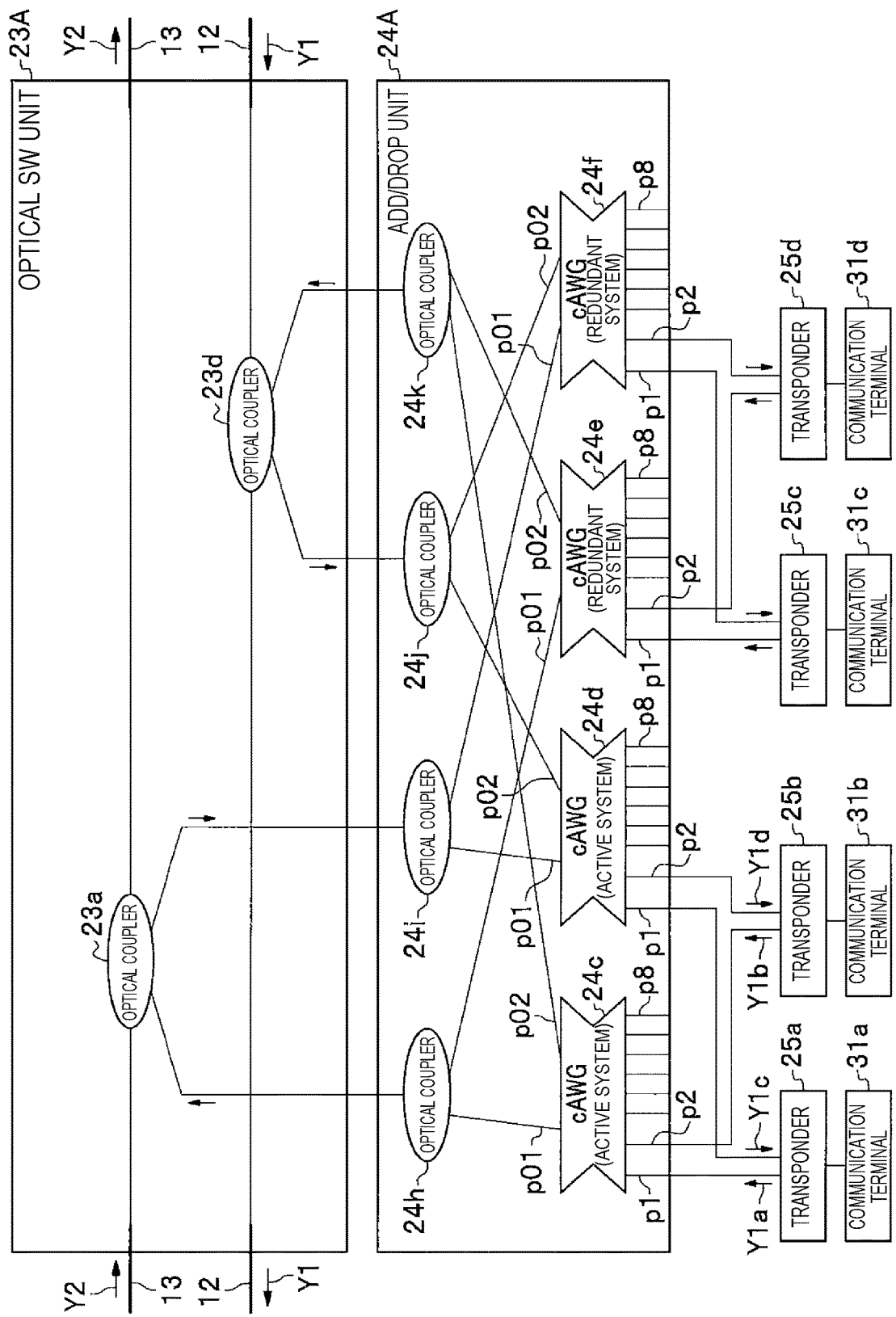
FIG. 10 is a block diagram illustrating other specific configurations of the light SW unit and the add/drop unit in the light transmission system of the present embodiment.

FIG. 10 is a block diagram illustrating other specific configurations of a light SW unit 23A and an add/drop unit 24A in the light transmission system 10 of the present embodiment.

The light SW unit 23A illustrated in FIG. 10 is different from the light SW unit 23 (FIG. 9) described above in that the light SW unit 23A only includes the optical couplers 23a and 23d. The add/drop unit 24A is different from the add/drop unit 24 (FIG. 9) described above in that the add/drop unit 24A includes optical couplers 23h, 23i, 23j, and 23k in addition to the cAWGs 24c and 24e and the cAWGs 24d and 24f. The cAWGs 24c and 24e and optical couplers 24h to 24k connected with the ports p01 and p02 thereof are combined to achieve an add function. The cAWGs 24d and 24f and optical couplers 24i and 24j connected with the ports p01 and p02 thereof are combined to achieve a drop function. Hereinafter, these cAWGs are also referred to as AWGs 24c and 24e of the add function and AWGs 24d and 24f of the drop function.

The optical coupler 23a connected with the optical fiber 13 in the light SW unit 23A is connected with the optical couplers 23h and 23i in the add/drop unit 24A. The optical coupler 23d connected with the optical fiber 12 is connected with the optical couplers 23j and 23k. The optical coupler 23h is connected with the second side ports p01 of the cAWG 24c and 24e. The optical coupler 23i is connected with the second side ports p01 of the cAWG 24d and 24f. The optical coupler 23j is connected with the second side ports p02 of the cAWG 24d and 24f. The optical coupler 23k is connected with the second side ports p02 of the cAWG 24c and 24e.

It is assumed that, in such a configuration, wavelength change control of the transponders 25a to 25d is performed under remote control by the monitoring control device 15. However, the present description will be made on the active system.

Specifically, it is assumed that, for example, an optical signal of the wavelength λ1 is output from the transponder 25a in the direction indicated with the arrow Y1a. The optical signal of the wavelength λ1 is input to the port p1 of the cAWG 24c of the add function and output from the port p01 through the optical coupler 24h and the optical coupler 23a to the optical fiber 13 in the direction of the arrow Y2.

For example, an optical signal of the wavelength λ3 transmitted through the optical fiber 13 is input to the optical coupler 23a on the optical fiber 13 side. The optical signal is bifurcated at the optical coupler 23a, input to the port p01 of the cAWG 24d of the drop function through the optical coupler 24i, and further input from the port p1 to the transponder 25a as illustrated with the arrow Y1c. However, in a case in which the optical signal of the wavelength λ3 is output from the port p2 of the cAWG 24d, the optical signal of the wavelength λ3 is input to the transponder 25b as illustrated with the arrow Y1d.

It is assumed that, for example, an optical signal of the wavelength λ1 is output from the transponder 25b in a direction indicated with the arrow Y1b. The optical signal of the wavelength λ1 is input to the port p2 of the cAWG 24c of the add function and output from the port p02 through the optical coupler 24k and the optical coupler 23d to the optical fiber 12 in the direction of the arrow Y1.

For example, an optical signal of the wavelength 23 transmitted through the optical fiber 12 is input to the optical coupler 23d on the optical fiber 12 side. The optical signal is bifurcated at the optical coupler 23d, input from the port p02 of the cAWG 24d through the optical coupler 24j, and further input from the port p1 to the transponder 25a as illustrated with the arrow Y1c. However, in a case in which the optical signal of the wavelength 23 is output from the port p2 of the cAWG 24d, the optical signal of the wavelength 23 is input to the transponder 25b as illustrated with the arrow Y1d.

In such optical signal transmission, the monitoring control unit 21 performs wavelength change control on the nodes 11a to 11d in accordance with a wavelength change control instruction from the monitoring control device 15 as follows. For example, it is assumed that an optical signal of the wavelength $\lambda 1$ is transmitted from the transponder 25a to the optical couplers 24h and 23a through the ports p1 and p01 of the cAWG 24c as illustrated with the arrow Y1a. In this case, when the wavelength $\lambda 1$ of the optical signal is changed to the wavelength $\lambda 4$ at the transponder 25a, the optical signal of the wavelength $\lambda 4$ after the wavelength change can be transmitted to a path (arrow Y2) identical to that for the optical signal of the wavelength $\lambda 1$ before the change because of transmission characteristics of the cAWG 24c.

In the cAWG 24c, as described above, optional transponder signals of, for example, the wavelengths $\lambda 1$ to $\lambda 29$ (refer to FIG. 4) can pass through the bandwidths of transmission bands of the ports p1 to p8. Thus, when the wavelength $\lambda 1$ of the optical signal from the transponder 25a is changed to the wavelength $\lambda 4$ as described above, the optical signal of the wavelength $\lambda 4$ after the change is transmitted to the same optical fiber 13 through the ports p1 and p01 of the cAWG 24c and the optical couplers 24h and 23a like the wavelength $\lambda 1$ before the change.

Accordingly, with the above-described color-less function as the first function, an optical signal from a transponder can be output at a different wavelength to the same path without change of physical wiring.

When the wavelength $\lambda 1$ of the optical signal from the transponder 25a is changed to the wavelength $\lambda x$ and the cAWG 24c has a characteristic that the wavelength $\lambda x$ is output from the port p02 when input through the port p1, the optical signal of the wavelength $\lambda x$ after the change is transmitted through the ports p1 and p02 of the cAWG 24c and the optical couplers 24k and 23d to the optical fiber 12 in the direction of the arrow Y1.

Accordingly, with the above-described direction-less function as the second function, an optical signal from a transponder can be output through an optional path, in other words, a different path without change of physical wiring.

An optical signal of the wavelength $\lambda 1$ is transmitted from the one transponder 25a and output to the optical couplers 24h and 23a through the ports p1 and p01 of the cAWG 24c as illustrated with the arrow Y1a. An optical signal of the same wavelength $\lambda 1$ is transmitted from the other transponder 25b and output to the optical couplers 24k and 23d through the ports p2 and p02 of the cAWG 24c as illustrated with the arrow Y1b. In this case, the optical signals of the same wavelength $\lambda 1$ are transmitted to the optical fibers 12 and 13 as different transmission paths through the different ports p01 and p02 of the cAWG 24c, and thus do not collide.

Accordingly, with the above-described contention-less function as the third function, output to a path different from an existing path can be performed at the same wavelength from different transponders without change of physical wiring.

<Effects of Embodiment>

The following describes effects of the optical add/drop multiplexer as each of the nodes 11a to 11d according to the present embodiment. The optical add/drop multiplexer drops or adds an optical signal between the optical add/drop multiplexer and each of the transponders 25a to 25n connected with the communication terminals 31a to 31n, the optical signal being transmitted by wavelength division multiplexing to a light transmission path included in a communication network.

(1) The optical add/drop multiplexer includes a plurality of first side ports and a plurality of second side ports connected between each of the transponders 25a to 25n and the light transmission path. In the optical add/drop multiplexer, a first channel interval of each of the first and second side ports is a plurality of times larger than a second optical signal input-output channel interval of ports of the transponders 25a to 25n. The optical add/drop multiplexer includes the cAWGs 24a and 24b in which optical signals of a plurality of different wavelengths from one or a plurality of the transponders 25a to 25n or the light transmission path can pass through a first channel.

The cAWGs 24a and 24b each cause an optical signal from each of the transponders 25a to 25n to pass through the first channel at one of the first side ports. In addition, the cAWGs 24a and 24b each output and transmit the passing optical signal to the light transmission path in a cyclic relation determined in accordance with a corresponding second side port among the plurality of second side ports and the wavelength of the output optical signal from the transponder. In addition, the cAWGs 24a and 24b each cause the optical signal transmitted through the light transmission path to pass through the first channel at one of the second side ports. In addition, the cAWGs 24a and 24b each output the passing optical signal to the corresponding one of the transponders 25a to 25n in a cyclic relation determined in accordance with the first side port among the plurality of first side ports and the wavelength of the output optical signal from the transponder.

With this configuration, one or transponder signals of a plurality of different wavelengths can pass through channels at the first and second side ports of the cAWG. Thus, when the wavelength (for example, a wavelength $\lambda 1$) of a transponder signal from each of the transponders 25a to 25n is changed to another wavelength $\lambda 4$, similarly to the transponder signal of the wavelength $\lambda 1$ before the change, the transponder signal of the wavelength $\lambda 4$ after the change can be transmitted to an identical light transmission path through the first and second side ports of the cAWGs 24a and 24b. Accordingly, transponder signals as optical signals from the transponders 25a to 25n can be output at optional wavelengths to the same path without change of physical wiring between the optical add/drop multiplexer and each of the transponder devices 25a to 25n. Thus, the optical add/drop multiplexer of the present invention does not include a multicast switch nor an amplifier configured to compensate light loss, which leads to reduction of device cost and electric power consumption.

(2) The light SW unit 23 configured to transmit or cut off, when the light transmission path includes a different light transmission path, an optical signal between the different light transmission path and each of the cAWGs 24a and 24b is provided. When the wavelength of a transponder signal from each of the transponders 25a to 25n is changed to a different wavelength, the light SW unit 23 transmits an optical signal including the transponder signal of the changed wavelength to both or one of different light transmission paths.

With this configuration, an optical signal from each of the transponders 25a to 25n can be output through an optional path, in other words, a different path without change of physical wiring between the optical add/drop multiplexer and each of the transponder devices 25a to 25n.

(3) When the plurality of cAWGs 24a and 24b and the plurality of transponders 25a to 25n provided, the light SW unit 23 transmits, to different light transmission paths, transponder signals having an identical wavelength, transmitted from the different transponders 25a to 25n, and having passed through the first channels at the different cAWGs 24a and 24b.

With this configuration, output from a path different from an existing path can be performed at the same wavelength from the different transponders 25a to 25n without change of physical wiring between the optical add/drop multiplexer and each of the transponder devices 25a to 25n.

<First cAWG Port Number Increasing Configuration>

Figure 11:
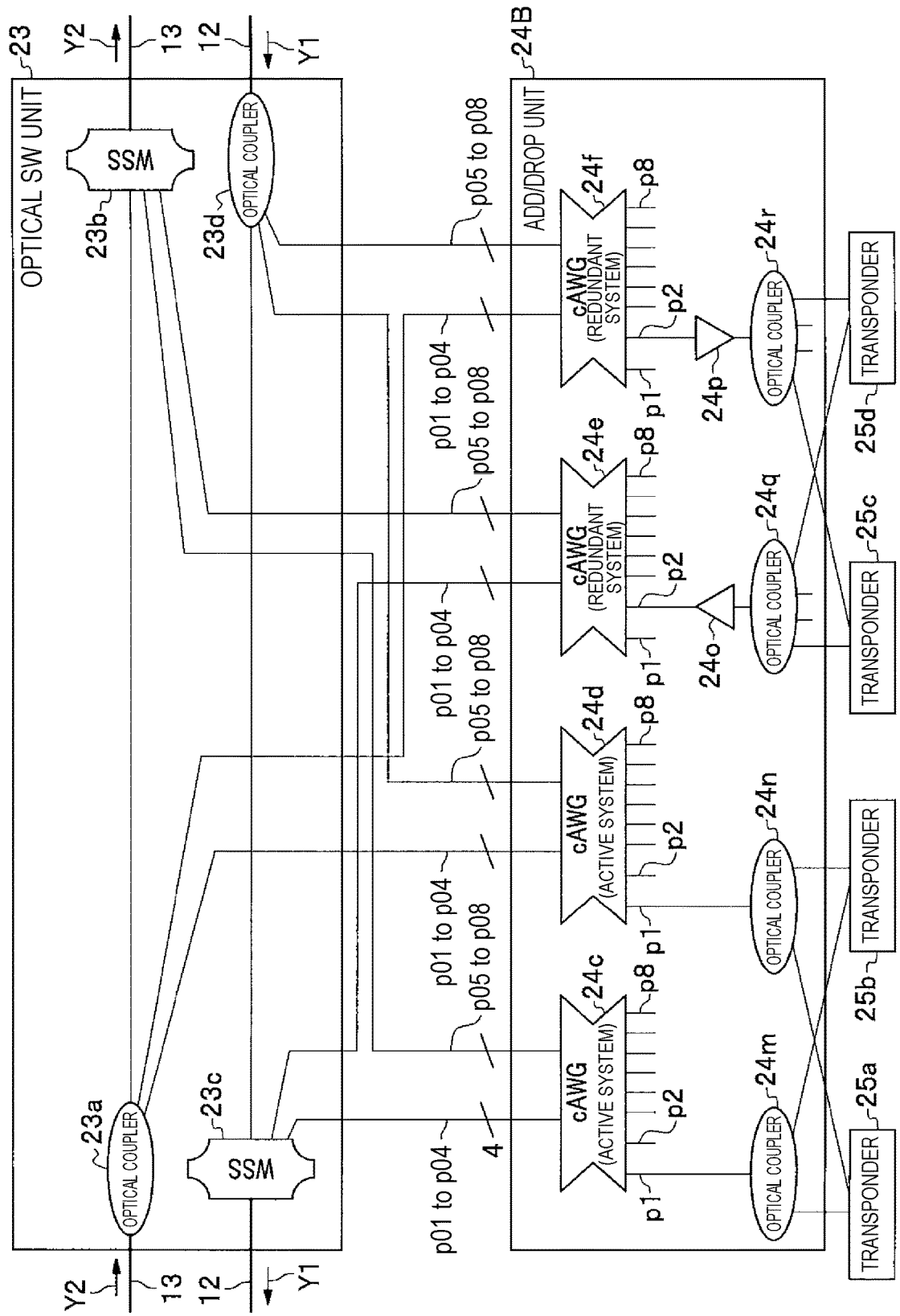
FIG. 11 is a block diagram illustrating a first port number increasing configuration of an add unit or drop unit including a cAWG and an optical coupler in the add/drop unit in the light transmission system of the present embodiment.

FIG. 11 is a block diagram illustrating a first port number increasing configuration of the add and drop units including cAWGs, optical couplers, and the like in the add/drop unit in the light transmission system.

The configuration of an add/drop unit 24B illustrated in FIG. 11 is different from the configuration of the add/drop unit 24 (FIG. 9) in that a 1×2 (or 1×N) optical coupler 24m is connected between the first side port p1 of the cAWG 24c and the transponder 25a and a 1×2 optical coupler 24n is connected between the first side port p1 of the cAWG 24d and the transponder 25b (increasing design 1). Another difference is that a 1×N optical coupler 24q is connected between the first side the port p2 of the cAWG 24e and the transponder 25c through an optical amplifier 24o, and a 1×N optical coupler 24r is connected between the first side the port p2 of the cAWG 24f and a transponder 25r through an optical amplifier 24p (increasing design 2). Only the increasing design 1 or the increasing design 2 may be implemented in the configuration of the add/drop unit 24B in FIG. 11.

The cAWGs 24c and 24e and the optical couplers 24m and 24q connected with the ports p1 and p2 thereof are combined to achieve an add function (add unit). The cAWGs 24d and 24f and the optical couplers 24n and 24r connected with the ports p1 and p2 thereof are combined to achieve a drop function (drop unit).

The number of possible connections of the transponders 25a to 25d illustrated in FIG. 9 depends on the number of cAWG ports of the cAWGs 24c and 24e and the cAWGs 24d and 24f. Thus, the number of transponders connectable with the add/drop unit 24B has a limitation.

Thus, in the present embodiment, the 1×N optical couplers 24m to 24r are connected between the first side port p1 or p2 of the corresponding one of the cAWGs 24c and 24e and the cAWGs 24d and 24f and the corresponding one of the transponders 25a to 25d as described above. With this connection, for example, when the optical couplers 24m to 24r each have 1×2 ports, two of the transponders 25a to 25d can be connected with one port p1 or p2 of the corresponding one of the cAWGs 24c and 24e and the cAWGs 24d and 24f.

Accordingly, in the increasing design 1, transponders can be connected in a number two times larger than that for the configuration of connection with the cAWGs 24c and 24e and the cAWGs 24d and 24f illustrated in FIG. 9.

In the increasing design 2, since the two 1×N optical couplers 24q and 24r are connected with the ports p2 of the cAWGs 24e and 24f, respectively, optical signals multiplexed at the 1×N optical couplers 24q and 24r pass through the cAWGs 24e and 24f (AWGs). In this case, only optical signals corresponding to the ports p1 to p8 of the cAWGs 24e and 24f (AWGs) pass.

Thus, in the increasing design 2, wavelengths in a number Wx equal to "AWG channel interval/channel interval of transponder output optical signals −1" can be input to the ports p1 to p8 in effective. The upper limit value of an effective number of connectable transponders is "the wavelength number Wx×the number of AWG ports". In this case, large signal loss occurs through N bifurcations at the optical couplers 24q and 24r. In other words, an optical signal attenuates to a predetermined value or lower. However, the amplifiers 24o and 24p are each connected between the port p2 of the corresponding one of the cAWGs 24e and 24f and the corresponding one of the two 1×N optical couplers 24q and 24r, thereby achieving signal amplification to solve the signal loss.

With such an increasing configuration of the add/drop unit 24B, it is possible to increase the number of transponders connectable with the cAWGs 24c and 24e and the cAWGs 24d and 24f as cAWGs through 1×N optical couplers.

<Second cAWG Port Number Increasing Configuration>

Figure 12:
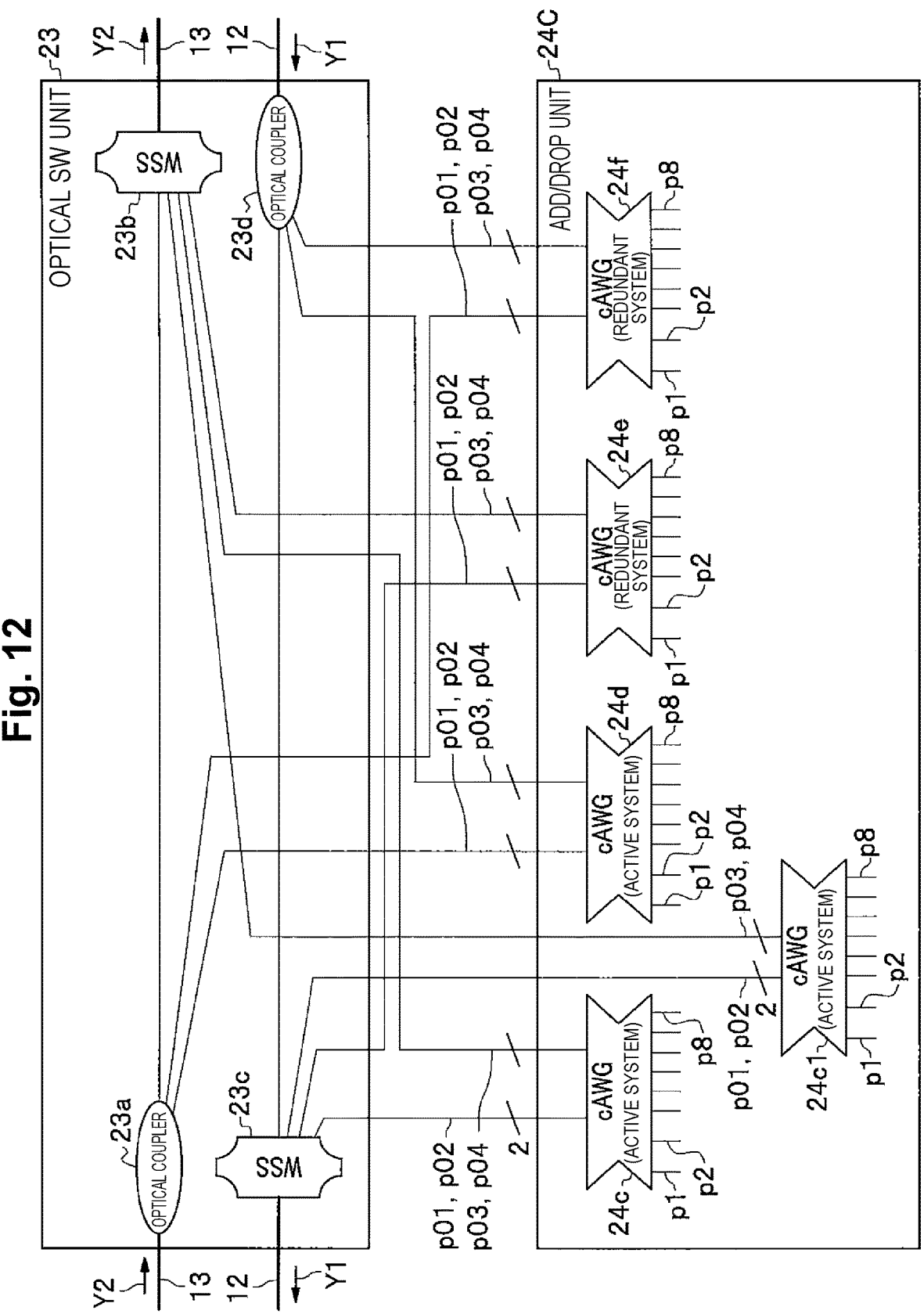
FIG. 12 is a block diagram illustrating a second port number increasing configuration of the add unit or the drop unit with a cAWG in the add/drop unit in the light transmission system of the present embodiment.

FIG. 12 is a block diagram illustrating a second port number increasing configuration of the add and drop units including cAWGs in the add/drop unit in the light transmission system.

The configuration of an add/drop unit 24C illustrated in FIG. 12 is different from the configuration of the add/drop unit 24 illustrated in FIG. 9 in that, in addition to the cAWG 24c in existing connection, a cAWG 24c1 is connected in parallel with the WSSs 23c and 23b interposed in the respective optical fibers 12 and 13. It is assumed that the cAWGs 24c and 24e, the cAWGs 24d and 24f, and the cAWG 24c1 each have four second side ports p01, p02, p0³, and p04.

Figure 13:
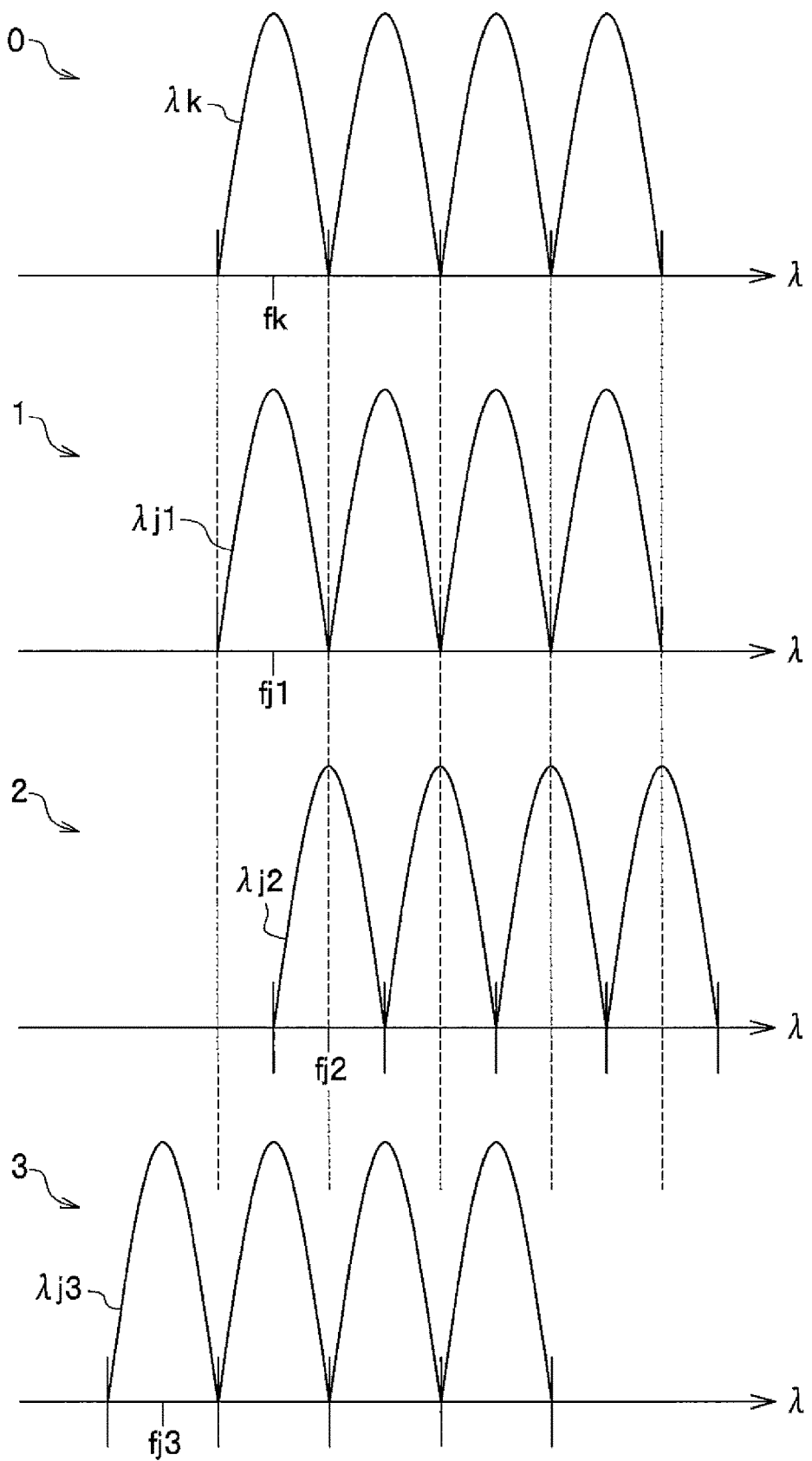
FIG. 13 is a diagram illustrating the relation between a port input-output signal wavelength (reference wavelength) for a 1×N add unit in existing connection and a port input-output signal wavelength (target wavelength) of a 1×N add unit in additional connection in parallel in the add/drop unit in the light transmission system of the present embodiment.

In the above-described parallel connection, it is assumed that a port transmission wavelength (target wavelength λj) of the cAWG 24c1 as a connection target has a plurality of relations as illustrated in FIG. 13 with a port transmission wavelength (reference wavelength λk) of the cAWG 24c in existing connection.

It is assumed that the first relation is a relation in which a central frequency fj1 of the target wavelength λj1 indicated by Reference Sign 1 in FIG. 13 is adjusted to a central frequency fk of the reference wavelength λk indicated by Reference Sign 0.

It is assumed that the second relation is a relation in which a central frequency fj2 of a target wavelength λj2 indicated by Reference Sign 2 is shifted by half wavelength relative to the central frequency fk of the reference wavelength λk.

It is assumed that the third relation is a relation in which a central frequency fj3 of a target wavelength λj3 indicated by Reference Sign 3 is shifted by one wavelength relative to the central frequency fk of the reference wavelength λk.

Alternatively, the target wavelength λj may have both characteristics of the second relation and the third relation.

In this manner, when the 1×N cAWG 24c1 is newly connected in parallel in addition to the 1×N cAWG 24c in existing connection with the WSSs 23 and 23b, transponders in a number equal to N ports of the newly connected cAWG 24c1 can be additionally connected. Thus, with the cAWG second port number increasing configuration, since a cAWG is newly connected in parallel with a WSS, the number of transponders connectable with the add/drop unit 24C is increased.

<Mixed Configuration of Single Carrier Optical Path and Multi Carrier Optical Path>

Figure 14:
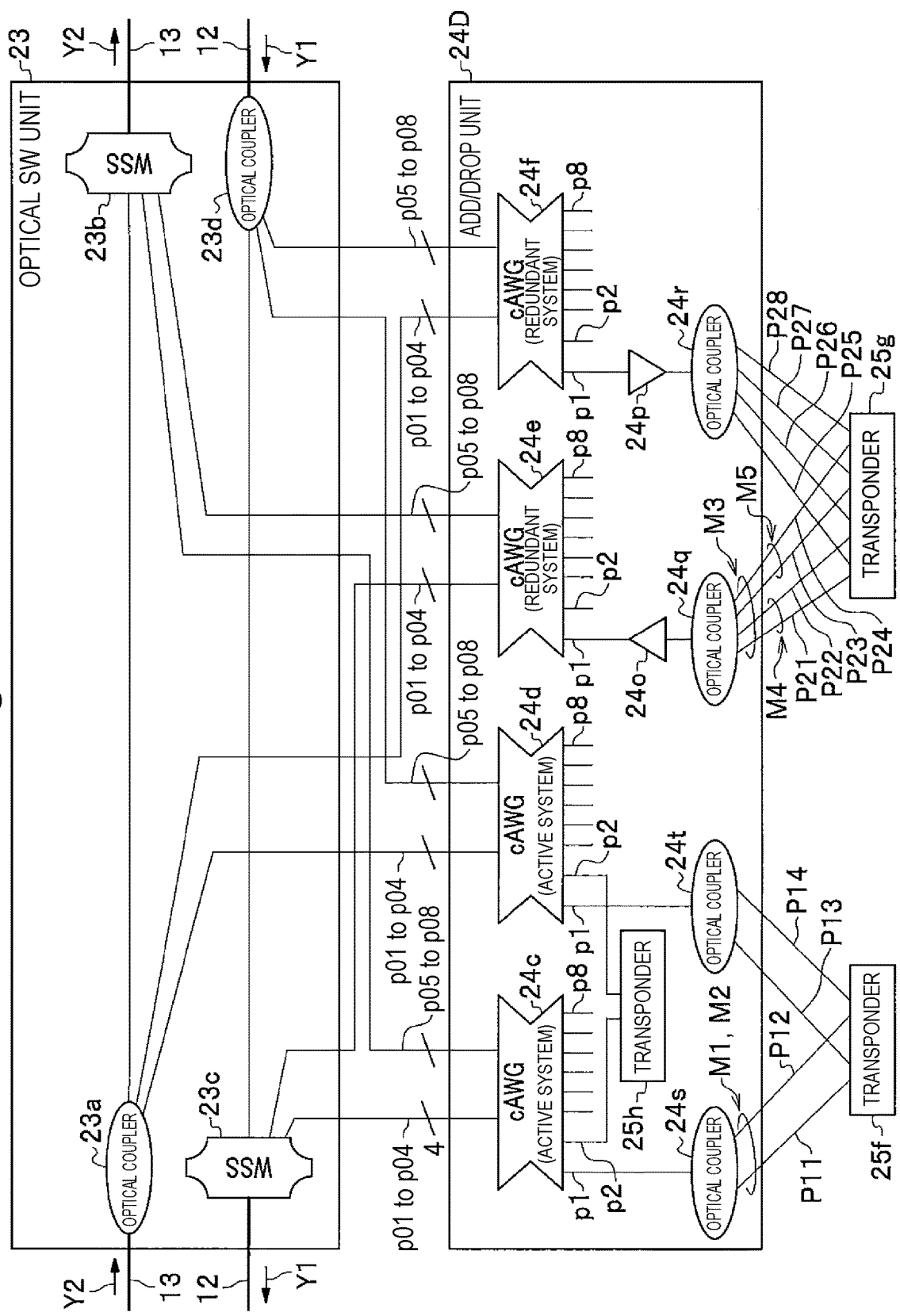
FIG. 14 is a block diagram illustrating a mixed configuration of a single carrier optical path and a multi carrier optical path in the light transmission system of the present embodiment.

FIG. 14 is a block diagram illustrating a mixed configuration of a single carrier optical path and a multi carrier optical path in the light transmission system.

In the mixed configuration of an add/drop unit 24D illustrated in FIG. 14, components described below are provided in addition to the components of the add/drop unit 24 illustrated in FIG. 9. Specifically, as illustrated in the add/drop unit 24D in FIG. 14, 1×2 optical couplers 24s and 24t are additionally connected with the first side ports p1 of the cAWGs 24c and 24d (first additional configuration). In addition, 1×4 optical couplers 24q and 24r are additionally connected with the first side ports p1 of the cAWGs 24e and 24f through optical amplifiers 24o and 24p (second additional configuration).

The cAWGs 24c and 24e and the optical couplers 24s and 24t connected with the ports p1 thereof are combined to achieve an add function. The AWGs 24d and 24f and the optical couplers 24q and 24r connected with the ports p1 thereof are combined to achieve a drop function.

In addition, a multi carrier optical path transponder 25f including two transmission ports p11 and p12 and two reception ports p13 and p14 is connected with the above-described connected 1×2 optical couplers 24s and 24t. Furthermore, a multi carrier optical path transponder 25g including four transmission ports p21, p22, p23, and p24 and four reception ports p25, p26, p27, and p28 is connected with the above-described connected 1×4 optical couplers 24q and 24r. Moreover, single carrier optical path transponders 25h are connected with one port (for example, the port p2) in the first side ports p1 to p8 of the cAWGs 24c and 24e and one port (for example, the port p2) in the first side ports p1 to p8 of the cAWGs 24d and 24f.

Figure 15:
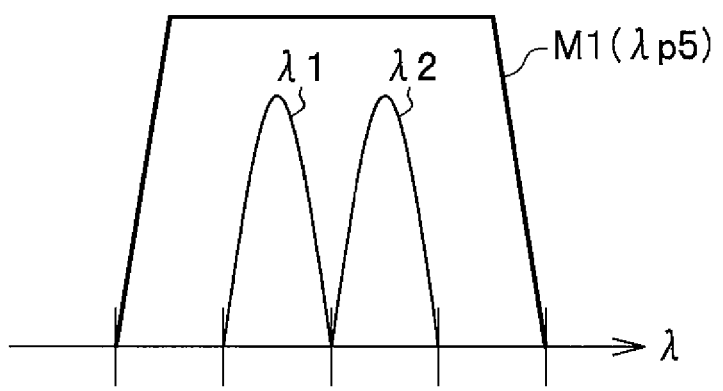
FIG. 15 is a diagram illustrating the wavelength of a multi carrier optical signal output from a multi carrier optical path transponder.

A multi carrier optical signal M1 in which an optical signal of the wavelength λ1 and an optical signal of the wavelength λ2 illustrated in FIG. 15 are superimposed is transmitted from the two transmission ports p11 and p12 of the multi carrier optical path transponder 25f. The transmitted multi carrier optical signal M1 is input to the port p1 of the cAWG 24c of the add function through the optical couplers 24s and 24h. After the input, the transmitted multi carrier optical signal M1 is output from the port p01 of the cAWG 24c and transmitted through the WSS 23c to the optical fiber 12 in the direction of the arrow Y1.

A multi carrier optical signal (refer to the multi carrier optical signal M1 in FIG. 15) bifurcated at the optical coupler 23a on the optical fiber 13 side is input to the port p01 of the cAWG 24d of the drop function and input from the port p1 to the reception ports p13 and p14 of the transponder 25f through the optical coupler 24t.

For example, a single carrier optical signal (not illustrated) of the wavelength λ3 is transmitted from a transmission port of the single carrier optical path transponder 25h and input to a port (for example, the port p2) of the cAWG 24c other than the multi carrier optical path. A single carrier optical signal bifurcated at the optical coupler 23a on the optical fiber 13 side is input to a reception port of the transponder 25h through the ports p02 and p2 of the cAWG 24d.

In addition, a multi carrier optical signal M2 (refer to the multi carrier optical signal M1 in FIG. 15) in which two optical signal (not illustrated) of wavelengths λ41 and λ42 are superimposed may be transmitted from the two transmission ports p11 and p12 of the transponder 25f. In this case, the transmitted multi carrier optical signal M2 can be transmitted through the optical coupler 24s, the ports p1 and p05 of the cAWG 24c, and the WSS 23b to the optical fiber 13 in the direction of the arrow Y2.

In this manner, the single carrier optical path and the multi carrier optical path can be provided in mixture.

A multi carrier optical signal M3 in which optical signals of the four wavelengths λ1 to λ4 (not illustrated) are superimposed can be transmitted from the four transmission ports p21 to p24 of the other multi carrier optical path transponder 25g. The transmitted multi carrier optical signal M3 is input to the port p1 of the cAWG 24e of the add function through the optical coupler 24q. After the input, the multi carrier optical signal M3 is output from, for example, the port p05 of the cAWG 24e and transmitted through the WSS 23b to the optical fiber 13 in the direction of the arrow Y2.

In this manner, a signal (refer to the multi carrier optical signal M3) of a larger number of wavelengths can be input to a port of an identical cAWG (refer to the cAWG 24e) by transmitting the multi carrier optical signal M3 in which optical signals of the four wavelengths λ1 to λ4 are superimposed, and thus large-volume data transmission can be performed through one path.

Alternatively, a multi carrier optical signal M4 in which optical signals of the two wavelengths λ1 and λ2 (not illustrated) are superimposed may be transmitted from two ports p21 and P22 among the four transmission ports p21 to p24 of the transponder 25g, and a multi carrier optical signal M5 in which optical signals of the two wavelengths λ41 and λ42 (not illustrated) are superimposed may be transmitted from the other two ports p23 and P24.

In this case, the multi carrier optical signals M4 and M5 are input to the port p1 of the cAWG 24e through the optical coupler 24q. The input multi carrier optical signal M4 is transmitted through the WSS 23b to the optical fiber 13 in the direction of the arrow Y2. The input multi carrier optical signal M5 is transmitted through the WSS 23c to the optical fiber 12 in the direction of the arrow Y1.

In this manner, when the number of optical signals superimposed in each of the multi carrier optical signals M4 and M5 are reduced and the multi carrier optical signals M4 and M5 are transmitted in opposite directions through the different optical fibers 12 and 13, data transmission can be performed through both systems.

<Configuration of Guard Function and Monitoring Function>

Figure 16:
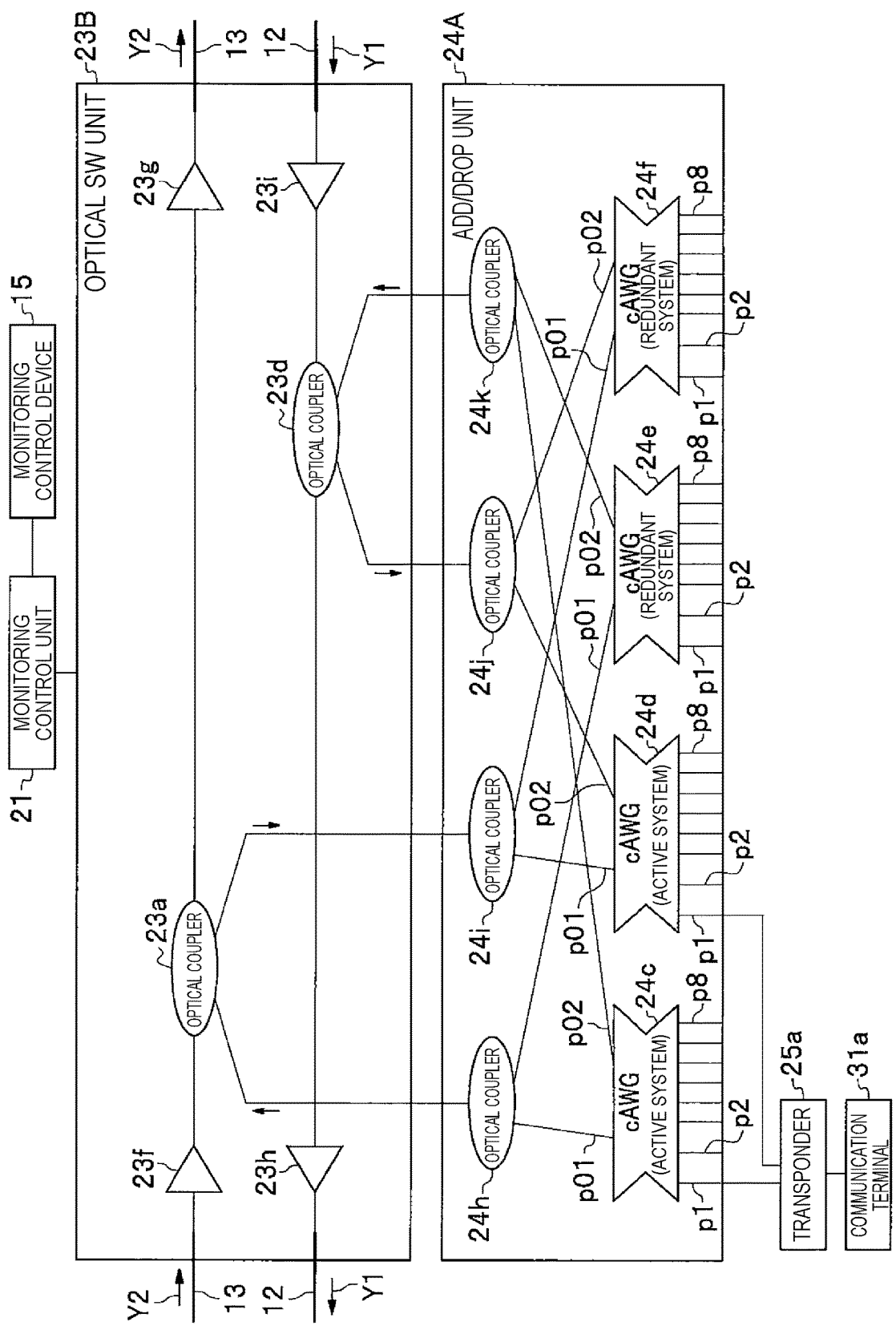
FIG. 16 is a block diagram illustrating the configuration of a guard function and a monitoring function in the light transmission system of the present embodiment.

FIG. 16 is a block diagram illustrating the configuration of a guard function and a monitoring function in the light transmission system of the present embodiment. In the configuration illustrated in FIG. 16, any component illustrated in FIG. 10 is denoted by the same reference sign, and description thereof is omitted.

In the configuration illustrated in FIG. 16, an optical amplifier 23f is connected with an input side of the optical coupler 23a on the optical fiber 13 side in a light SW unit 23B, an optical amplifier 23g is connected with an output side thereof, the optical amplifier 23i is connected with an input side of the optical coupler 23d on the optical fiber 12 side, and the optical amplifier 23h is connected with an output side thereof.

When paths are provided in both directions through the optical fibers 12 and 13, the paths are a clockwise path from one side to the other side, which is illustrated with the arrow Y1, and a anticlockwise path from the other side to the one side, which is illustrated with the arrow Y2. Each path is connected with the transponder 25a through the optical couplers 23a and 23d and the cAWG 24a. Each path is also connected with an opposite side transponder (not illustrated) configured to perform communication with the transponder 25a through the optical fibers 12 and 13.

With this configuration, for example, when the output wavelength of the transponder 25a is changed for some reason, an optical signal is potentially output to an unintentional path and causes a penalty due to collision and crosstalk with another optical signal. For example, the above-described penalty potentially occurs when the transponder 25a is changed to the different wavelength λ4 at change from the wavelength λ1 to the wavelength λ2 for some reason.

Thus, the monitoring control unit 21 monitors input power and the number of input wavelengths of the optical amplifiers 23f to 23i connected with the input and output sides of the optical couplers 23a and 23d interposed in the optical fibers 12 and 13. The monitoring control unit 21 stops output from the transponder 25a when the monitored input power or number of input wavelengths deviates by a predetermined value or more from input power or the number of input wavelengths included in path setting information of path generation control, which is instructed by the monitoring control device 15. In this case, output from the opposite side transponder for the transponder 25a is stopped as necessary. Accordingly, it is possible to prevent an optical signal from being output to a different path and causing a penalty due to collision and crosstalk with another optical signal when the output wavelength of the transponder 25a is unintentionally changed as described above.

When light receiving power is different from a reference value, a reception unit of the transponder 25a may notify the monitoring control unit 21 of this error information so that the monitoring control unit 21 stops outputs from the transponder 25a and the opposite side transponder.

Other specific configurations may be modified as appropriate without departing from the scope of the present invention.

REFERENCE SIGNS LIST

10 light transmission system
11a, 11b, 11c, 11d node (optical add/drop multiplexer)
12, 13 optical fiber
15 monitoring control device
15a NBI
15b SBI
15c path calculation unit
15d DB
16 higher-level device
21 monitoring control unit
23f to 23i, 24o, 24p optical amplifier
23 optical SW unit
24 add/drop unit
24a, 24b cAWG
24c, 24e cAWG
24d, 24f cAWG
23a, 23d, 24h to 24k, 24m, 24n, 24q, 24r optical coupler
25a, 25b, . . . , 25n transponder
31a, 31b, . . . , 31n communication terminal

The invention claimed is:

1. An optical add/drop multiplexer configured to drop or add an optical signal between the optical add/drop multiplexer and a transponder connected with a communication terminal, the optical signal being transmitted by wavelength division multiplexing to a light transmission path included in a communication network, the optical add/drop multiplexer comprising:
a cyclic arrayed waveguide grating (cAWG) that includes a plurality of first side ports and a plurality of second side ports connected between the transponder and the light transmission path and in which a first channel interval of each of the first and second side ports is a plurality of times larger than a second channel interval of an optical signal input to and output from the transponder and optical signals of a plurality of different wavelengths from one or a plurality of transponders or the light transmission path can pass or transmit through a first channel, wherein the cAWG is configured to
cause an optical signal output from each transponder to pass through the first channel at one of the first side ports,
output and transmit the passing optical signal to the light transmission path in a cyclic relation determined in accordance with a corresponding second side port among the plurality of second side ports and the wavelength of the output optical signal from the transponder,
cause the optical signal transmitted through the light transmission path to pass through the first channel at one of the second side ports, and
output the passing optical signal to the transponder in a cyclic relation determined in accordance with the first side port among the plurality of first side ports and the wavelength of the output optical signal from the transponder; and
a 1×N optical coupler that includes a port connectable with a port of the cAWG and includes ports connectable with a plurality of the transponders is connected between the cAWG and the transponder.

2. The optical add/drop multiplexer according to claim 1, further comprising an optical switch (SW) unit, including one or more processors, configured to transmit or cut off, when the light transmission path includes a different light transmission path, an optical signal between the different light transmission path and the cAWG, wherein when the wavelength of a transponder signal as an optical signal from each transponder is changed to a different wavelength, the optical SW unit is configured to transmit the transponder signal of the changed wavelength to the different light transmission path.

3. The optical add/drop multiplexer according to claim 2, wherein when a plurality of the cAWGs and a plurality of the transponders are provided, the optical SW unit is configured to transmit, to different light transmission paths, transponder signals having an identical wavelength, transmitted from different transponders, and having passed through the first channel at different cAWGs.

4. The optical add/drop multiplexer according to claim 2, wherein
the optical SW unit includes a wavelength selective switch (WSS) configured to perform multiplexing-demultiplexing of the wavelength of an optical signal transmitted to the light transmission path and path switching of the optical signal, and
the cAWG is connected in parallel with the WSS.

5. The optical add/drop multiplexer according to claim 1, wherein
an optical amplifier is connected between the cAWG and the 1×N optical coupler.

6. The optical add/drop multiplexer according to claim 1, wherein N ports of the 1×N optical coupler are connected with a multi carrier optical path transponder including a plurality of transmission ports and a plurality of reception ports, and the cAWG is connected with a single carrier optical path transponder.

7. A light transmission system comprising:
an optical add/drop multiplexer configured to drop or add an optical signal between the optical add/drop multiplexer and a transponder connected with a communication terminal, the optical signal being transmitted by wavelength division multiplexing to a light transmission path included in a communication network, the optical add/drop multiplexer comprising:
a cyclic arrayed waveguide grating (cAWG) that includes a plurality of first side ports and a plurality of second side ports connected between the transponder and the light transmission path and in which a first channel interval of each of the first and second side ports is a plurality of times larger than a second channel interval of an optical signal input to and output from the transponder and optical signals of a plurality of different wavelengths from one or a plurality of the transponders or the light transmission path can pass or transmit through a first channel, wherein the cAWG is configured to
cause an optical signal output from each transponder to pass through the first channel at one of the first side ports,
output and transmit the passing optical signal to the light transmission path in a cyclic relation determined in accordance with a corresponding second side port among the plurality of second side ports and the wavelength of the output optical signal from the transponder,
cause the optical signal transmitted through the light transmission path to pass through the first channel at one of the second side ports, and
output the passing optical signal to the transponder in a cyclic relation determined in accordance with the first side port among the plurality of first side ports and the wavelength of the output optical signal from the transponder; and
a 1×N optical coupler that includes a port connectable with a port of the cAWG and includes ports connectable with a plurality of the transponders is connected between the cAWG and the transponder; and
a monitoring control device separately connected with the optical add/drop multiplexer and configured to instruct optical path generation control and wavelength change control to the optical add/drop multiplexer,
wherein the optical add/drop multiplexer includes a monitoring control unit, including one or more processors, configured to perform the instructed optical path generation control and wavelength change control to generate an optical path and change the wavelength of an optical signal in the optical add/drop multiplexer.

8. The light transmission system according to claim 7, wherein
the optical add/drop multiplexer includes a second optical coupler connected with a light transmission path and configured to bifurcate or connect an optical signal, and an optical amplifier connected with an input-output side of the second optical coupler, and
when input power of the optical amplifier or the number of wavelength of an input optical signal deviates by a predetermined value or more from input power or the number of wavelength of an input optical signal at path generation control, which is instructed by the monitoring control device, the monitoring control unit is configured to perform control to stop output from a transponder that transmits and receives optical signals to and from the optical coupler.

9. The optical add/drop multiplexer according to claim 7, further comprising an optical switch (SW) unit, including one or more processors, configured to transmit or cut off, when the light transmission path includes a different light transmission path, an optical signal between the different light transmission path and the cAWG, wherein when the wavelength of a transponder signal as an optical signal from each transponder is changed to a different wavelength, the optical SW unit is configured to transmit the transponder signal of the changed wavelength to the different light transmission path.

10. The optical add/drop multiplexer according to claim 9, wherein when a plurality of the cAWGs and a plurality of the transponders are provided, the optical SW unit is configured to transmit, to different light transmission paths, transponder signals having an identical wavelength, transmitted from different transponders, and having passed through the first channel at different cAWGs.

11. The optical add/drop multiplexer according to claim 9, wherein
the optical SW unit includes a wavelength selective switch (WSS) configured to perform multiplexing-demultiplexing of the wavelength of an optical signal transmitted to the light transmission path and path switching of the optical signal, and
the cAWG is connected in parallel with the WSS.

12. The optical add/drop multiplexer according to claim 7, wherein
an optical amplifier is connected between the cAWG and the 1×N optical coupler.

13. The optical add/drop multiplexer according to claim 7, wherein N ports of the 1×N optical coupler are connected with a multi carrier optical path transponder including a plurality of transmission ports and a plurality of reception ports, and the cAWG is connected with a single carrier optical path transponder.

* * * * *